United States Patent
Jass

(10) Patent No.: US 11,270,311 B1
(45) Date of Patent: Mar. 8, 2022

(54) SYSTEMS AND METHODS FOR A CONTEXT-DRIVEN ELECTRONIC TRANSACTIONS FRAUD DETECTION

(71) Applicant: Worldpay, LLC, Symmes Township, OH (US)

(72) Inventor: Nicole S. Jass, Aurora, CO (US)

(73) Assignee: WORLDPAY, LLC, Symmes Township, OH (US)

( * ) Notice: Subject to any disclaimer, the term of this patent is extended or adjusted under 35 U.S.C. 154(b) by 597 days.

(21) Appl. No.: 16/233,466

(22) Filed: Dec. 27, 2018

(51) Int. Cl.
  *G06Q 20/40* (2012.01)
  *G06Q 20/38* (2012.01)
(52) U.S. Cl.
  CPC ....... *G06Q 20/4016* (2013.01); *G06Q 20/388* (2013.01); *G06Q 20/4014* (2013.01)
(58) Field of Classification Search
  None
  See application file for complete search history.

(56) References Cited

U.S. PATENT DOCUMENTS

| | | | |
|---|---|---|---|
| 2011/0238575 A1* | 9/2011 | Nightengale | H04L 61/2007 705/44 |
| 2018/0211233 A1* | 7/2018 | Gupta | G06Q 20/4016 |
| 2018/0211256 A1* | 7/2018 | Anson | G06Q 20/409 |

OTHER PUBLICATIONS

NPL reference, "2017 Financial Impact of Fraud Study: Exploring the Impact of Fraud in a Digital World", dated Sep. 2017, downloaded from https://s3.amazonaws.com/dive_static/paychek/Financial_Impact_of_Fraud_Study_FINAL.pdf and attached as a PDF file (Year: 2017).*

* cited by examiner

*Primary Examiner* — James D Nigh
*Assistant Examiner* — Margaret M Neubig
(74) *Attorney, Agent, or Firm* — Bookoff McAndrews, PLLC

(57) ABSTRACT

Systems and methods are disclosed for establishing a multi-dimensional fraud detection system and payment analysis. One method includes: receiving transaction history of a user, the transaction history including a first payment vehicle and a second payment vehicle; determining, of the received transaction history, one or more instances of switching from one the first payment vehicle to the second payment vehicle; and determining a user-specific abandonment score for the user, based on the determined instances of switching from the first payment vehicle to the second payment vehicle.

20 Claims, 11 Drawing Sheets

SYSTEMS AND METHODS FOR A CONTEXT-DRIVEN ELECTRONIC TRANSACTIONS FRAUD DETECTION

TECHNICAL FIELD

Various embodiments of the present disclosure relate generally to an electronic payment authorization infrastructure employing a context-driven fraud detection system. More particularly, embodiments of the present disclosure relate to authorizing or denying transactions based on historical user data and payment vehicle information.

BACKGROUND

An average consumer in the United States carries about four to six different credit and/or debit cards in their wallet and may use different cards for different types of transactions. Traditionally, financial institutions (e.g., banks) monitor an individual's credit or debit card activity to check for any fraudulent activities. Most transaction fraud systems monitor cardholders' buying behavior at the individual card level. However, monitoring transactions at the card level provides a limited view of the spending patterns of a consumer. Additionally, monitoring buying behavior for fraudulent activities at the individual card level creates problems, since some fraudulent activity may go unnoticed, whereas valid transactions may be inadvertently declined. The most common solution today is to decline suspicious transactions even without confirmation of fraud, which then typically prompts the consumer to use a different credit/debit card to complete the transaction. This practice further results in a poor consumer experience and lost revenue opportunities for the merchant, as well as for card issuers or other financial institutions.

The present disclosure is directed to overcoming one or more of these above-referenced challenges.

SUMMARY OF THE DISCLOSURE

According to certain aspects of the disclosure, systems and methods are disclosed for authorizing payment for consumer transactions based on historical user data and payment vehicle information.

In one embodiment, a computer-implemented method is disclosed for establishing a multi-dimensional fraud detection system and payment analysis. The method includes: receiving transaction history of a user, the transaction history including a first payment vehicle and a second payment vehicle; determining, of the received transaction history, one or more instances of switching from one the first payment vehicle to the second payment vehicle; and determining a user-specific abandonment score for the user, based on the determined instances of switching from the first payment vehicle to the second payment vehicle.

In accordance with another embodiment, a system is disclosed for establishing a multi-dimensional fraud detection system and payment analysis. The system comprises: a data storage device storing instructions for establishing a multi-dimensional fraud detection system and payment analysis in an electronic storage medium, and a processor configured to execute the instructions to perform a method including: receiving transaction history of a user, the transaction history including a first payment vehicle and a second payment vehicle; determining, of the received transaction history, one or more instances of switching from one the first payment vehicle to the second payment vehicle; and determining a user-specific abandonment score for the user, based on the determined instances of switching from the first payment vehicle to the second payment vehicle.

In accordance with another embodiment, a non-transitory machine-readable medium is disclosed that stores instructions that, when executed by a computer, cause the computer to perform a method for establishing a multi-dimensional fraud detection system and payment analysis. The method includes: receiving transaction history of a user, the transaction history including a first payment vehicle and a second payment vehicle; determining, of the received transaction history, one or more instances of switching from one the first payment vehicle to the second payment vehicle; and determining a user-specific abandonment score for the user, based on the determined instances of switching from the first payment vehicle to the second payment vehicle.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. The disclosed systems and methods discussed below may allow advertisers to understand users' online behaviors through the indirect use of raw data and may maintain privacy of the users and the data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

Figure 1A:
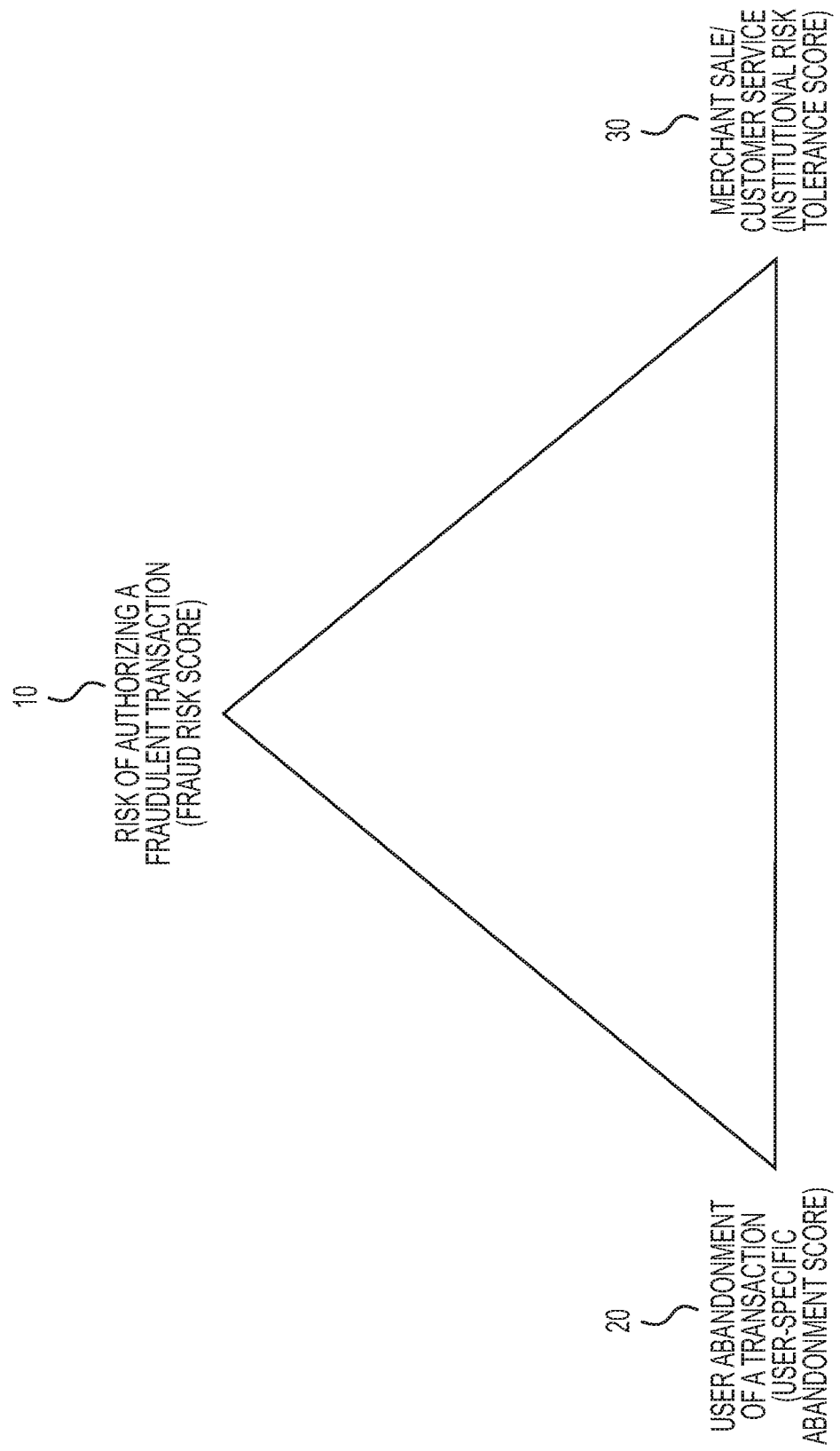
FIG. 1A is a schematic diagram of a system for establishing a multidimensional payment authorization system, according to an exemplary embodiment.

As used herein, the term "exemplary" is used in the sense of "example," rather than "ideal." In addition, the terms "first," "second," and the like, herein do not denote any order, quantity, or importance, but rather are used to distinguish one concept or structure from another. Moreover, the terms "a" and "an" herein do not denote a limitation of quantity, but rather denote the presence of one or more of the referenced items. For the purposes of the disclosure, "user" or "consumer" are used interchangeably, and may refer to any individual or person for whom a transaction is being enacted.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

First, there is a desire to improve fraud detection. Improved fraud detection may decrease the chances of a valid transaction being inadvertently declined. In addition, there is a desire to refine payment mechanisms to balance risk of fraud against revenue opportunities for a merchant, financial institution, or payment vehicle issuer. The present disclosure describes systems and methods of a multidimensional analysis for payment authorization. The multidimensional analysis may improve identification of fraudulent transactions using an analysis of aggregated user tender-switching behavior and contextual factors of a transaction.

The present disclosure may provide enhanced fraud detection by continually generating a universal fraud detection profile based on transaction data across multiple payment vehicles (e.g., credit and debit cards in a consumer's wallet), as well as context information associated with each of the payment vehicles. Transaction data may be aggregated in a database and indexed to merchants, consumers, locations, times, and/or households using identifying information associated with the transaction, such as personally identifiable information (PII) of an individual associated with the transaction, a device fingerprint, device-specific information, an originating IP address (which may be determined through IP proxy piercing), timing of the transaction, etc. The personally identifying information (PII) may be leveraged from e-commerce data, such as by e-mail address, mailing address, or other unique identifier (e.g., a hash or alphanumeric code). This information may then be used to train and execute an aggregated fraud scoring system to better predict and act on fraudulent transactions. Thus, various embodiments of the present disclosure relate generally to analyzing online or brick-and-mortar transactions for fraudulent activity across data aggregated from transaction data. In some cases, the data may be aggregated across card/payment vehicle issuers. In one embodiment, the universal fraud detection profile may include a computed fraud risk score for a new transaction, indicating an objective risk of the new transaction being fraudulent.

The present disclosure further provides systems and methods for authorizing or denying transactions based, not just on the likelihood of fraud, but also, a merchant's or a user's urgency to complete a transaction. Currently, transactions may be denied if a likelihood of fraud is detected, regardless of a user's ability to mitigate the "detected fraud." Transactions may also be denied, regardless of a merchant/financial institution/issuer's desire to develop customer affiliation or its ability to absorb a fraudulent transaction. In the present disclosure, however, a response to a payment authorization request may not only take into account an objective risk of fraud. Denying or approving a transaction payment request may further hinge on a user's patience before abandoning a transaction, as well as a merchant, financial institution, or issuer's risk tolerance for fraud.

As illustrated in FIG. 1A, a payment system (e.g., payment system 100 of FIG. 1B) may weigh various factors in authorizing payment for a transaction. Weighing the factors may include a balance of elements, e.g., balancing the objective likelihood that a requested transaction/payment authorization is fraudulent against two subjective elements: 1) the likelihood that a user will abandon a transaction and 2) merchant's desire to complete a transaction (despite a risk of fraud). The present disclosure describes computing a fraud risk score 10 as an indication of the objective likelihood that a requested transaction/payment is fraudulent or the objective risk that authorization of a request will result in authorizing a fraudulent transaction. The present disclosure further describes quantifying the two subjective elements, for example, by computing a user-specific abandonment score 20 reflecting a user's likelihood to abandon any given transaction vs. tender switching; as well as an institutional risk tolerance score 30 reflecting merchant preferences for sales and/or customer service.

In one embodiment, each authorization request for a transaction may include a fraud risk score. The fraud risk score may serve as an indication of the likelihood that the authorization request is fraudulent. For example, a high-risk score may indicate that the request is more likely fraudulent and a low risk score may indicate that the request is not likely fraudulent. The fraud risk score may depend on the context of a transaction, including, for instance, the device(s) used in the transaction, the merchant with whom the user is conducting the transaction, the time (e.g., time of day) of the transaction, etc. Device(s) used in the transaction may increase or decrease the likelihood of a transaction being fraudulent, for example, based on a device fingerprint, device-specific information, device location, an originating IP address, which may be determined through IP proxy piercing, etc. Similarly, the likelihood of fraud may vary with respect to a type of merchant (e.g., chain store versus family-owned), or a timeframe.

The fraud risk score may also be based on the payment vehicle being used, a transaction history associated with the payment vehicle, the location of the transaction, the payment amount associated with the transaction, prior payment vehicle(s) used for the transaction, etc. For example, a fraud risk score may be higher for a new payment vehicle (e.g., a newly issued credit card) over a payment vehicle that may have a long transaction history. A fraud risk score may also be higher for payment vehicles with lower interest rates or for payment vehicles with direct access to financial institutions (e.g., debit cards). A location of a transaction may impact a fraud risk score. For example, if a user's transaction history is generally in city "X" and the user's payment vehicle is being used in city "Y," an authorization request received from a location in city "Y" may prompt an increased fraud risk score. The payment amount may also influence a fraud risk score, e.g., if authorization is requested for a payment significantly higher than the user's typical transactions. For instance, if a user's transactions typically total to $2,000 per a month, an authorization request for a single, $4,000 purchase may prompt an increased fraud risk score.

Approval (or denial) of the authorization request may involve evaluating the fraud risk score against a user-specific abandonment score and an institutional risk tolerance threshold. The present disclosure describes systems and methods for computing a user-specific abandonment score, which may indicate a user's tendency to complete a transaction versus the user's tendency of "abandoning" a transaction. Abandoning a transaction may entail a user opting to not complete a transaction. For example, a user who has his/her credit card denied may leave a transaction/merchant site without completing the transaction. Some users may switch to another form of payment (e.g., "switch tender") and try to complete a transaction if his/her payment is denied; other users may abandon a transaction if his/her payment is denied. For example, a first user "A," may switch tender until a form of tender is accepted for a transaction. For instance, user "A" may switch from one credit card to another until a credit card is accepted. Another user "B" may abandon a transaction if a single credit card is denied. In other words, user "B" may not switch tender at all before abandoning a transaction. In one embodiment of the present disclosure, user "A" may have his/her suspicious transactions denied at a higher frequency because tender-switching practices of user "A" indicate that user "A" will switch tender until suspicion of fraud is reduced. According to one embodiment of the present disclosure, user "B", may not have his/her first credit card denied even if the transaction is as suspicious as user "A"'s transaction. This is because the exemplary system and method may prioritize completing the transaction over risk of fraud. If the disclosed system detects that user "B" may abandon the transaction if his/her credit card is denied, the system may opt to complete the transaction and authorize the credit card even if the transaction may be fraudulent.

Exemplary user "C" may generally try three (3) payment vehicles out of his/her wallet prior to abandoning a transaction. In such a case, the disclosed systems and methods may include denying the transaction until user "C" has switched tender twice, meaning user "C" may be on the verge of abandoning the transaction. At this point, the third form of payment (e.g., credit card) offered by user "C" may be accepted for payment in the transaction, even if the suspicion of fraud for the transaction has not decreased, or has not decreased past a threshold acceptable for the transaction to not likely be fraudulent. In any of the embodiments, payment may be authorized if the suspicion of fraud (e.g., denoted by the fraud risk score) decreases to the point that the transaction is not likely be fraudulent. For example, even if user "C" can be denied authorization twice before abandonment, authorization may be granted if the likelihood of fraud is very low upon user "C" offering the second payment vehicle.

In short, tender-switching may refer to a user switching from one form of tender (e.g., a first credit card) to another form of tender (e.g., a second credit card). Tender-switching practices may be monitored with any form of tracked payment (e.g., via credit cards, debit cards, payment applications, payment services, blockchain, etc.). A user's tender-switching practices may be used to compute a user-specific abandonment score. The user-specific abandonment score may entail a user's ability or desire to lower the risk of fraud, e.g., by offering alternative payment that could lower or erase the possibility of fraud.

The present disclosure further discusses computing an institutional risk tolerance score, which may denote the level/risk of fraud at which a merchant or a financial institution is still willing to authorize a transaction. Non-fraudulent transactions are desirable. However, institutions (e.g., merchants, financial institutions, or payment vehicle issuers) may favor completing transactions and absorbing the risk of fraud. In one embodiment, such may set institutional risk tolerance scores. In other words, institutions may set an institutional risk tolerance for the level of fraud they are willing to tolerate. For example, a new business or a seller of luxury goods may wish to proceed with transactions, despite risk of fraud, because they want to offer a customer experience that fosters a customer affiliations. Such merchants may set high institutional risk tolerance scores. Alternately, some merchants may be more conservative in their models, and set low institutional risk tolerance scores as a result.

In one embodiment, institutional risk tolerance scores may also be user-specific, given the fraudulent activity associated with a user, or given a user's transaction history. For instance, a financial institution may set a higher institutional risk tolerance for user(s) that are rarely associated with any fraudulent activity. If a user has several incidences of fraudulent activity in his/her transaction history, a financial institution may set an institutional risk tolerance for that user. In some scenarios, institutional risk tolerance may be set or adjusted at predetermined time intervals (e.g., every year or every quarter). Time intervals may also correspond to factors that are not related to a selected user. For example, the number of transactions may experience a spike in November and December as many users are preparing for holidays. During this time, financial institutions may set a low institutional risk tolerance, since the institutions may not be able to sustain high amounts of fraud when transactions are occurring at such high numbers. Alternately or in addition, institutional risk tolerance may be adjusted on a continual basis, as transaction data is received for each user.

One way to lower the risk of fraud while accounting for a merchants' desire to complete a transaction, is to deny suspicious transactions until either a consumer may abandon the transaction, or until the risk of fraud is within an institution's risk tolerance. If an authorization request is denied, a user may try again (using another form of tender, aka, "switch tender"), or the user may abandon the transaction. The user's reaction to the denial may be predicted based on the user-specific abandonment score.

In the event of detected tender-switching, payment authorization for the transaction may further depend on the name or billing address of each of the cards/payment vehicles used by the user for the transaction. For example, authorization may be granted if a user switches between three cards for a transaction and the billing address or name associated with each of the three cards is the same across all three cards. This may be because the likelihood that a user is trying to attempt a fraudulent transaction may decrease with the consistency across all three cards. Inconsistencies between the cards (e.g., in billing address or name associated with each card) could be indicative of a user having a stack of credit cards that may not belong to him/her. This could mean an increased likelihood of a fraudulent transaction, and authorization may be denied for instances of mismatches in payment vehicle information during a user's tender-switching. The name or billing address may be part of personally identifiable information (PII) associated with each payment vehicle. For example, each payment vehicle may be associated with PII, which may include at least a name, email address, date of birth, and physical address.

A payment vehicle may include any form of payment, including credit cards, debit cards, smart cards, gift cards, pre-paid cards, electronic currency (e.g., currency provided through a cellular telephone, personal digital assistant, decentralized ledger), etc. payment vehicles may include traditional plastic transaction cards, titanium-containing, or other metal-containing transaction cards, translucent transaction cards, foldable or otherwise unconventionally-sized transaction cards, radio-frequency enabled transaction cards, quick response codes ("QR codes"), etc. A payment vehicle may include electronic functionality provided by a network of electronic circuitry that may be printed or otherwise incorporated onto or within the payment vehicle (e.g., known in the art as a "smart card"), include a fob having a transponder and an RFID reader, and/or employ any image/code reader known in the art.

Transaction history may comprise a collection of transaction data. Exemplary transaction history and/or transaction data may include an identifier of the merchant, an identifier of the user, an identifier of one or more payment means accessed for payment of the transaction, an itemization of the goods and/or services transacted for, any geographical and/or temporal information of the transaction, any taxes, tips, and/or gratuities, any discounts, coupons, reductions, any fees directed towards acquirers, issuers, payment networks, currency exchange rates, and any other attributes of the payment transaction.

One or more examples of these non-limiting embodiments are illustrated in the selected examples disclosed and described in detail with reference made to FIGS. 1A-6 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Figure 1B:
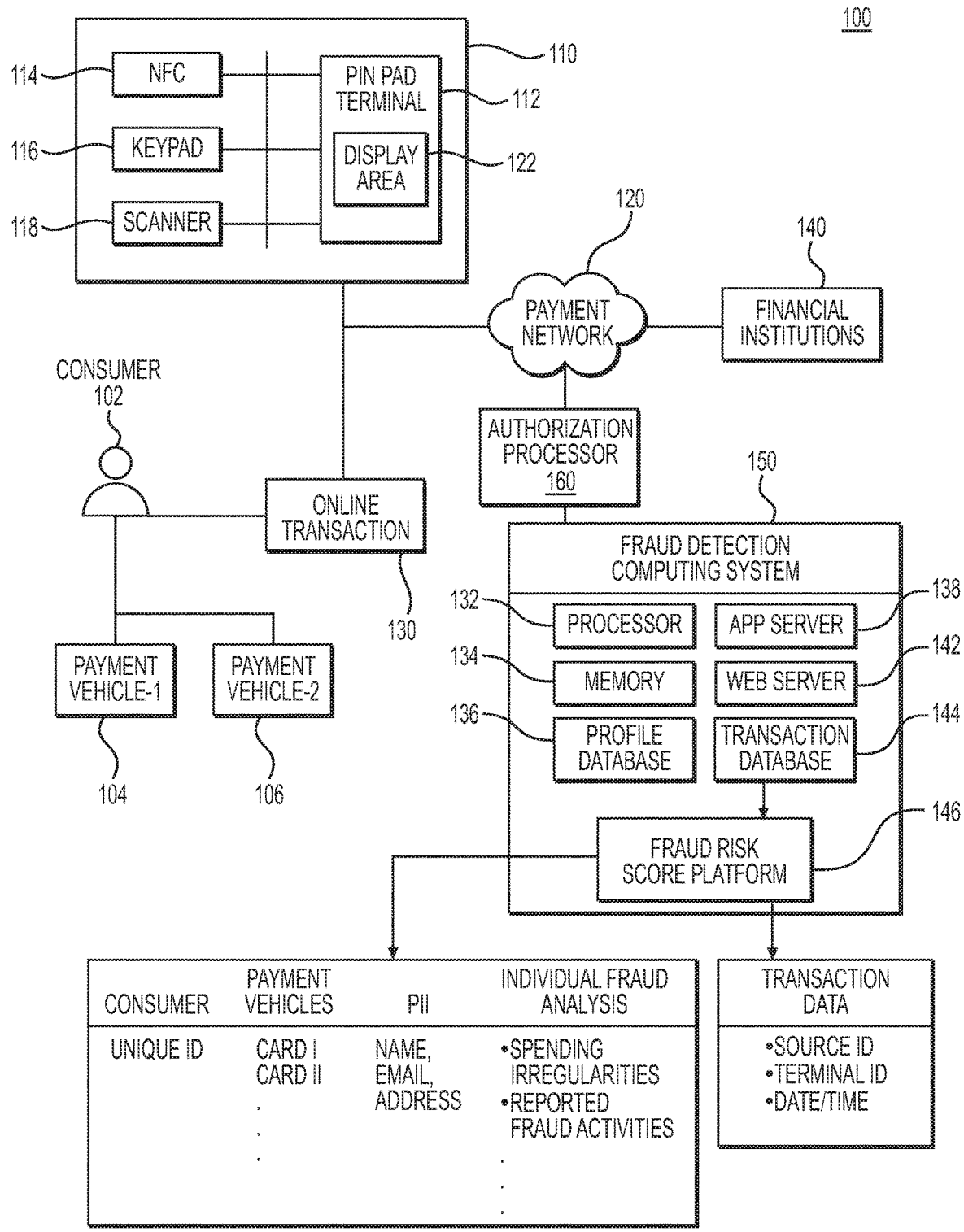
FIG. 1B depicts a block diagram of a payment system including a fraud detection computing system infrastructure and authorization processor for establishing a multidimensional payment authorization system, according to an exemplary embodiment.

Turning to FIG. 1B, an exemplary system infrastructure is depicted for payment processing within a merchant environment, according to one or more embodiments. In an example embodiment, a user (e.g., consumer 102) may use one or more payment vehicles to conduct transactions with one or more merchants 110 through a payment system 100. As shown in FIG. 1, merchant 110 may provide infrastructure for processing electronic payment requests. In one embodiment, a consumer 102 may pay for goods or services from a merchant 110 at a PIN pad terminal 112 associated with a point-of-sale ("POS") terminal. In one embodiment, an authorization processor 160 that handles financial transactions may transfer payment between the financial institution 140 of consumer 102 and that of merchant 110.

In one embodiment, consumer 102 may submit payment information at the PIN pad 112 associated with the merchant's POS terminal by swiping his/her payment card, inserting his/her chip-based payment card, through wireless near field communication (NFC), through a payment app, via a Quick Response code ("QR" code), etc., or by any other suitable means. PIN pad 112 may send a payment authorization request by way of a computer network 120 to an authorization processor 160 (e.g., one of financial institutions 140). Alternatively, such a request may be sent by a component that controls a flow of a transaction, such as point of sale (POS) engine. The authorization processor 160 may request, by way of payment network 120, an electronic transfer of funds from the received funds to the financial institution 140 associated with merchant 110.

In general, a fraud detection computing system 150 may be operated by an authorization processor, issuer processor, card issuer, or any other financial institution 140. The fraud detection computing system 150 may be operated by another entity or operated independently. In any event, fraud detection computing system 150 and authorization processor 160 may be configured to intercept authorization requests sent across payment network 120, or otherwise receive data about payment transactions sent between merchants 110 and financial institutions 140.

In an example embodiment, a fraud detection computing system 150 may comprise processor 132, memory 134, profile database 136, application server 138, web server 142, transaction database 144, and fraud risk score platform 146. The profile database 136 for an individual user may store a unique identifier hash recognizing the profile of the user, primary account numbers (e.g., PANs) or other identifiers of payment vehicles (e.g. debit, credit cards, mobile applications, etc.) associated with the user, personally identifiable information (PII), and/or data/analysis of an user's spending habits, geographic area, and fraud activities reported on the cards associated with the user. In an example embodiment, the personally identifiable information (PII) about the user involves at least one of his/her name, email address, date of birth, social security number, and physical address.

Processor 132 may send a notification to the financial institutions 140 reporting fraudulent activity it determines among requested authorizations of either online or brick-and-mortar payment transaction. The financial institutions 140 may reject the online or brick-and-mortar payment transaction according to the notification. Processor 132 may provide a score (e.g., a fraud risk score) embedded with every transaction to the financial institutions 126. The score may be a multidimensional score representing a probability of a requested transaction being fraudulent.

The transaction database 144 may store transaction data associated with the payment vehicles 104 and 106. A plurality of transaction parameters associated with consumer 102 (or payment vehicle 104 and payment vehicle 106) may be stored as transaction data. Transaction parameters may include account number, card number, payment vehicle information, product information (e.g., product identifier, product type, product serial number, etc.), transaction amount, loyalty account information, merchant information (e.g., source ID, terminal ID, IP address, transaction location, etc.), transaction date and time, whether the transaction was a 'card present' transaction, etc. In one embodiment, transaction database 144 may be generated by retrieving historical transaction data from an online or brick-and-mortar payment transaction before the online or brick-and-mortar payment transaction is sent to a financial institution for authorization.

The fraud risk score platform 146 may calculate the risk that a transaction (e.g., associated with an intercepted authorization request) is fraudulent. For example, fraud risk score platform 146 may compute a numeric score indicative of the likelihood that the transaction associated with the requested authorization is fraudulent. The authorization processor 160 may authorize or deny transaction requests based on the computed fraud risk score. In one embodiment, the authorization or denial of transaction requests are further weighed against other factors, including a user's likelihood to abandon a transaction if the authorization is denied (versus trying another form of payment), a merchant's desire to proceed with the transaction (despite the risk of fraud), or a financial institution's ability to sustain a fraudulent transaction. For the remainder of this disclosure, the user's likelihood to abandon a transaction may be described as a "user-specific abandonment score."

A merchant's desire to proceed with the transaction or a financial institution's ability to sustain a fraudulent transaction will be described in the disclosed embodiments by an "institutional risk tolerance score." The institutional risk tolerance score may denote a threshold at which a merchant or financial institution is willing to proceed with a transaction. For example, a merchant 110 that is a new business or a seller of luxury goods may wish to proceed with transactions. Such merchants may set high institutional risk tolerance scores. Alternately, some merchants may be more conservative in their models, and set low institutional risk tolerance scores as a result.

Analogously, each financial institution 140 may designate a risk threshold at which the risk of fraud is low enough for a transaction to be completed. A large financial institution 140 may determine that it has a relatively high institutional risk tolerance score (or high risk threshold) since it is stable enough to sustain a higher risk. A smaller financial institution 140 may set a lower institutional risk tolerance score (or low risk threshold) since it cannot sustain a high number of fraudulent transactions. Alternately, a small financial institution 140 may set a high institutional risk tolerance score to attract more business, so that more merchants or consumers would be willing to work with the small financial institution 140. A large financial institution may have the leverage to service a major population of merchants or consumers without needing to sustain the risk of having a high risk threshold for fraudulent transactions.

Figure 1C:
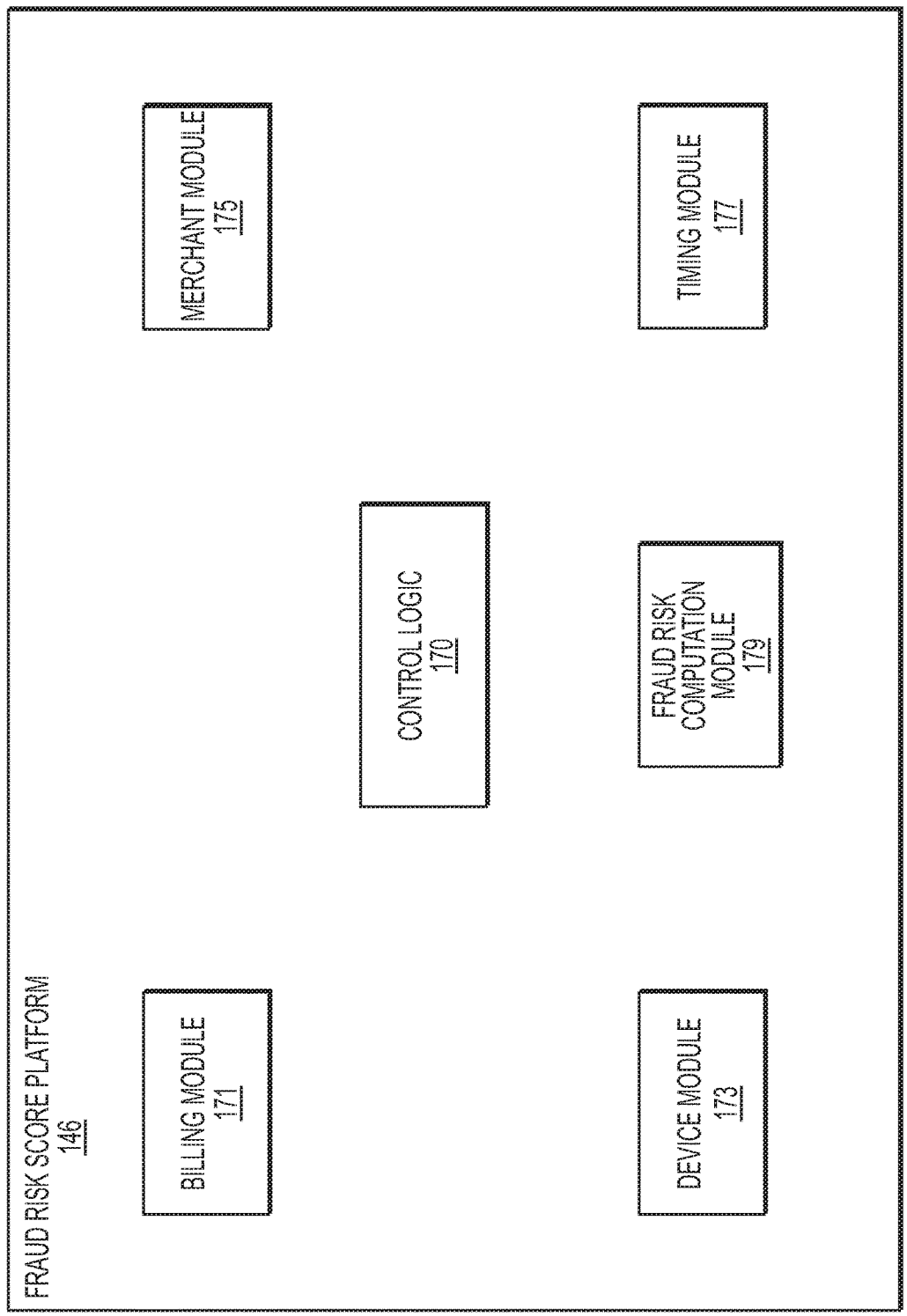
FIG. 1C depicts a block diagram of a fraud risk score platform of the fraud detection computing system of FIG. 1B, according to an exemplary embodiment.

FIG. 1C is a block diagram of an exemplary model of a fraud risk score platform 146 for computing an objective risk of a requested transaction/payment authorization being fraudulent, according to an exemplary embodiment of the present disclosure. In one embodiment, fraud risk score platform 146 may communicate with any component of payment system 100 over payment network 120 (e.g., using any suitable modem, wireless adapter, etc.). As shown in FIG. 1C, fraud risk score platform 146 may include a control logic 170, a billing module 171, a device module 173, a merchant module 175, a timing module 177, and a fraud risk computation module 179. Control logic 170 may direct the functions and interactions among the various modules.

In one embodiment, the control logic 170 and billing module 171 may identify, from the transaction data (e.g., of the transaction database 144), billing information associated with the requested transaction. Billing information may be associated with a payment vehicle used for the requested transaction. Billing information may include a user's name, billing address, account information (e.g., a bank account associated with any entity or service that may coordinate payment), etc. In one embodiment, transaction database 144 or control logic 170 may detect an instance of tender switching in processing a transaction, e.g., by detecting a plurality of payment vehicles being associated with one transaction/purchase. In one embodiment, control logic 170 and billing module 171 may detect billing information associated with each of the payment vehicles of the plurality of payment vehicles.

The fraud risk score platform 146 may be configured such that control logic 170 and fraud risk computation module 179 may decrease a fraud risk score if the billing information is consistent across each of the payment vehicles of the plurality of payment vehicles. Further, control logic 170 and fraud risk computation module 179 may increase a fraud risk score for each inconsistency between detect billing information of any payment vehicle of the plurality of payment vehicles. In alternative embodiments, the fraud risk score may also be defined such that a match in billing information of various payment vehicles causes an increase in a fraud risk score, and an inconsistency the billing information prompts a decrease in the fraud risk score.

For example, control logic 170 and fraud risk computation module 179 may receive an initial fraud risk score. The initial fraud risk score may be pre-set. Alternately, if a user profile is available for a user detected to be associated with a transaction, the fraud risk score may be based on the user profile. The user profile or initial user profile-based fraud risk score may be provided by profile database 136. Various embodiments of computing fraud risk from user behavior are disclosed, for example, in U.S. patent application Ser. No. 15/825,225, entitled "Systems and Methods for Aggregated Database for Cross-Issuer Fraud Detection System," which is incorporated herein by reference in its entirety.

Control logic 170 and billing module 171 may then receive or identify first payment vehicle billing information for a first payment vehicle associated with a transaction. If a user switches tender (e.g., because the first payment vehicle is declined), control logic 170 and billing module 171 may detect a second payment vehicle associated with the transaction. Control logic 170 and billing module 171 may then receive or identify second payment vehicle billing information for the second detected payment vehicle. The control logic 170 and fraud risk computation module 179 may update the initial fraud risk score based on a comparison of the first payment vehicle billing information to the second payment vehicle billing information. For example, if the first payment vehicle billing information matches the second payment vehicle billing information, control logic 170 and fraud risk computation module 179 may decrease the initial fraud risk score. By extension, if the first payment vehicle billing information does not matches the second payment vehicle billing information, control logic 170 and fraud risk computation module 179 may increase the initial fraud risk score.

If the user continues to switch tender, the control logic 170 and fraud risk computation module 179 may continue to adjust the updated fraud risk score, by comparing the additional payment vehicle billing information against already-detected payment vehicle billing information (e.g., the first payment vehicle billing information and the second payment vehicle billing information). For example, if a user switches tender six times and there are two billing addresses found between the six forms of tender, control logic 170 may detect that the user may simply have two billing addresses, and the resultant fraud risk score may be fairly close to the initial fraud risk score. If, however, a user switches tender six times and there are six different billing addresses detected, the resultant fraud risk score may be significantly higher than the initial fraud risk score. Fraud risk score platform 146 may be configured to associate the lack of billing address consistency with a higher likelihood that the transaction is fraudulent.

In one embodiment, the control logic 170, device module 173, and fraud risk computation module 179 may compute or update a fraud risk score, based on a device or any collected device data associated with a transaction. The control logic 170 and device module 173 may receive or identify from transaction database 136, at least one of a merchant's identification, a location and terminal information, a source IP address, a date and time, device information, and a transaction amount for each of one or more purchase transactions. Control logic 170 and device module 173 may further track a user habits related to device usage, e.g., app usage or the way a user may navigate through a merchant's site.

In one embodiment, control logic 170, device module 173, and fraud risk computation module 179 may be configured to recognize online purchases as being more likely fraudulent and in-person purchases as having a lower likelihood of being fraudulent. In such a case, control logic 170, device module 173, and fraud risk computation module 179 may be configured to increase an initial or adjusted fraud risk score if a transaction request is detected to be for an online purchase. A transaction may be identified as an online purchase transaction, if transaction data indicates a source IP address or device data including an identifier associated with a mobile device identifier or app. Further, control logic 170, device module 173, and fraud risk computation module 179 may be configured to decrease an initial or adjusted fraud risk score if a transaction request is detected to be for an in-person purchase. A transaction may be identified as an in-person transaction if transaction data indicates a point-of-sale ("POS") terminal.

In addition, control logic 170, device module 173, and fraud risk computation module 179 may increase a fraud risk score if device information related to a transaction request deviates from device information related to the user habits tracked by control logic 170 and device module 173. For example, control logic 170 and device module 173 may monitor device usage and note that a given user typically makes purchases from a merchant by accessing the merchant's website from a desktop computer, "device A." If a transaction related to the given user is detected, where the transaction request is associated with an app installed on a mobile device, "device B," control logic 170, device module 173, and fraud risk computation module 179 may prompt an increase to the fraud risk score due to the aberration.

In one embodiment, the control logic 170, merchant module 175, and fraud risk computation module 179 may compute or update a fraud risk score based on merchant information associated with a transaction. For example, control logic 170 and merchant module 175 may aggregate data across multiple transactions of transaction database 144 and find patterns related to merchants or categories of goods carried by merchants. For instance, control logic 170 and merchant module 175 may find that aggregated data of fraud detection computing system 150 indicates that transactions related to certain merchants or merchants of certain categories of goods are more prone to be fraudulent. For example, aggregated data may indicate that transactions related to merchants selling luxury goods or merchants selling low-cost goods are more prone to be fraudulent than transactions related to merchants selling mid-range products. In such a case, control logic 170, merchant module 175, and fraud risk computation module 179 may increase a fraud risk score if a merchant associated with a transaction request is a luxury goods or low-cost goods merchant, while decreasing a fraud risk score if the merchant associated with the transaction request carries mid-range products. As another example, aggregated data may indicate that family-owned businesses are more vulnerable to fraudulent activity than chain stores. In such an embodiment, control logic 170, merchant module 175, and fraud risk computation module 179 may increase a fraud risk score if the merchant of a transaction is a family-owned business, and decrease a fraud risk score if the merchant of the transaction is a chain store.

In one embodiment, the control logic 170, timing module 177, and fraud risk computation module 179 may compute or update a fraud risk score based on timing information associated with a transaction. For example, control logic 170 and timing module 177 may aggregate data across multiple transactions of transaction database 144 and find patterns related to merchants or categories of goods carried by merchants. For example, control logic 170 and timing module 177 may find that aggregated data of fraud detection computing system 150 indicates that transactions related to certain times of a day or year are more prone to be fraudulent. For example, aggregated data may indicate that fraudulent activity is higher at night than during the day, or that fraudulent activity is higher in December than during any other month. In such a case, control logic 170, timing module 177, and fraud risk computation module 179 may increase a fraud risk score if the timing of a transaction request is at night, while decreasing a fraud risk score if the timing of the transaction request is during the day. Alternately or in addition, control logic 170, timing module 177, and fraud risk computation module 179 may (further) increase a fraud risk score if the timing of a transaction request is in December, while decreasing or maintaining a fraud risk score if the timing of the transaction request is not during December.

In one embodiment, control logic 170 and fraud risk computation module 179 may compute a fraud risk score for a transaction based on data from one or more of the billing module 171, device module 173, merchant module 175, and timing module 177. Control logic 170 and fraud risk computation module 179 may compute or include an initial fraud risk score and continually update the initial fraud risk score based on detected data (for a particular transaction or from aggregated data) of one or more of the billing module 171, device module 173, merchant module 175, and timing module 177. In one embodiment, control logic 170 and fraud risk computation module 179 may generate analytics to weigh data from each of the billing module 171, device module 173, merchant module 175, and timing module 177, based on their contribution to accurately identifying fraud. Control logic 170 and fraud risk computation module 179 may further compute fraud risk scores based on the weighted data.

For example, control logic 170 and fraud risk computation module 179 may detect that information from merchant module 175 and timing module 177 are far stronger predictors of fraud than information from billing module 171 and device module 173. In such a case, control logic 170 and fraud risk computation module 179 may generate a weighing system for fraud risk score calculation, in which data of the merchant module 175 and timing module 177 are weighted more highly than data of the billing module 171 and device module 173 in computing a fraud risk score. Control logic 170 and fraud risk computation module 179 may further identify linkages between data of each of the modules. For example, even if billing module 171 detects inconsistent billing addresses, fraud risk may be low if device module 173 indicates an in-person transaction request (since a fraudulent user may be unlikely to scan several cards that he/she does not actually own, in a physical setting with a human cashier). Accordingly, control logic 170 and fraud risk computation module 179 may compute a fraud risk score for each transaction, while continually updating the configuration of the computation, based on feedback on the accuracy of the detection of fraud.

For instance, control logic 170 and fraud risk computation module 179 receive validation or an error message for each computed fraud risk score, the validation or error message denoting whether the transaction was fraudulent or whether the detection of fraud by control logic 170 and fraud risk computation module 179 was erroneous. The validation or error message may be received, for example, from fraud databases discussed in further detail in FIG. 2. Control logic 170 and fraud risk computation module 179 may continually update its fraud risk computation, based on the feedback.

Figure 1D:
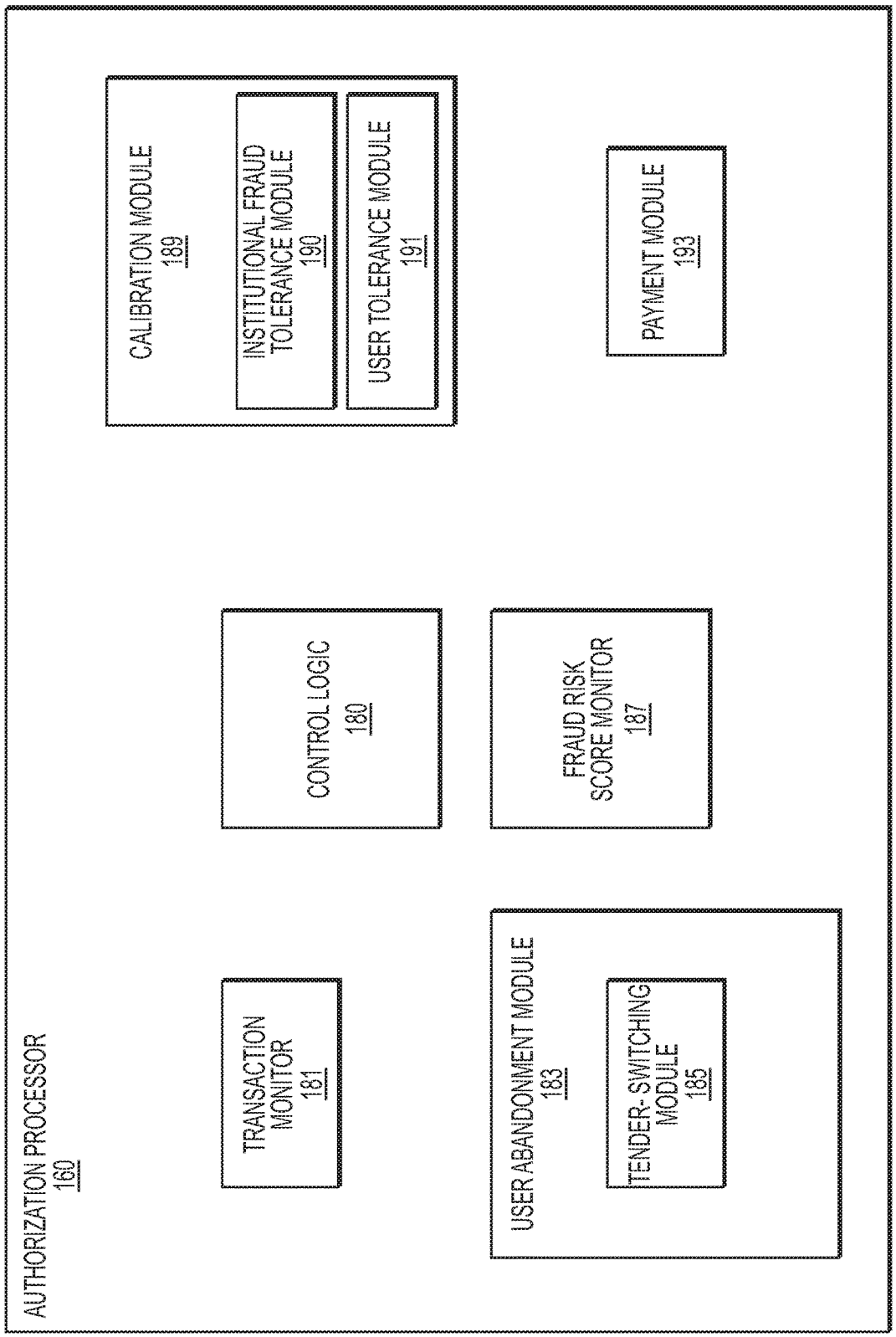
FIG. 1D depicts a block diagram of the authorization processor of the payment system of FIG. 1B, according to an exemplary embodiment.

FIG. 1D is a block diagram of an exemplary model of an authorization processor 160 for authorizing or denying transactions based on an objective risk of a requested transaction/payment authorization being fraudulent, a user-specific abandonment score, and an institutional risk tolerance score, according to an exemplary embodiment of the present disclosure. In one embodiment, authorization processor 160 may communicate with any component of payment system 100 over payment network 120 (e.g., using any suitable modem, wireless adapter, etc.). As shown in FIG. 1D, authorization processor 160 may include a control logic 180, a transaction monitor 181, a user abandonment module 183 (including a tender-switching module 185), a fraud risk score monitor 187, a calibration module 189 (including institutional fraud tolerance module 190 and user tolerance module 191), and a payment module 193. Control logic 180 may direct the functions and interactions among the various modules.

In one embodiment, the control logic 180 and transaction monitor 181 may receive transaction data, e.g., from the transaction database 144 of the fraud detection computing system 150. The transaction monitor 181 may detect authorization requests of one or more payment vehicles associated with a particular user, data on transactions completed using one or more of the payment vehicles, authorization requests that do not have corresponding completed transaction data, etc.

The control logic 180 and user abandonment module 183 may compute a user-specific abandonment score. The user-specific abandonment score may be based on analyses performed by control logic 180 and tender-switching module 185. In one embodiment, control logic 180 and tender-switching module 185 may identify instances of transactions that are associated with more than one payment vehicle. For example, for a single transaction, transaction data may include an authorization request associated with a first payment vehicle, a denial of the first payment vehicle, an authorization request for the transaction associated with a second payment vehicle, and data indicating that the transaction was completed using the second payment vehicle. In other words, the control logic 180 and tender-switching module 185 may detect the instances in which a user switches from one form of tender (e.g., a first payment vehicle) to another form of tender (e.g., a second payment vehicle).

The control logic 180 and tender-switching module 185 may detect the forms of tender that a user may switch between, the frequency at which a user may switch tender, and the number of times that a user may switch tender. The forms of tender that a user may switch between may include, for instance, a user switching between multiple credit cards if a credit card is denied. Another form of tender switching may include switching from a credit card to a debit card, or switching from a credit card to cash. The frequency that a user may switch tender may include detecting whether a user consistently uses one payment vehicle (e.g., a first credit card) for virtually all purchases, or whether a user switches between various payment vehicles, depending on the transaction. For example, a user may use a first payment vehicle for most travel expenses, a second payment vehicle for daily expenses (e.g., groceries or hobbies), and cash for small purchases.

The number of times that a user may switch tender may include how many times a user may switch tender before abandoning a transaction. For example, the control logic 180 and tender-switching module 185 may detect the number of times a user will switch tender if each form of tender is denied. For instance, one user may abandon a transaction if his/her credit card is denied. Another user may try 2-3 different credit cards or debit cards if authorization for a transaction using a first payment vehicle is denied. Yet another user may try several forms of alternate payment, in an attempt to complete the transaction rather than leaving without completing the purchase. The control logic 180 and tender-switching module 185 may assign, for each user, a metric based on the user's tender-switching practices. In one embodiment, the metric based on the user's tender-switching practices may be used to compute a transaction abandonment metric for the user.

For each user detected in payment system 100, control logic 180 and user abandonment module 183 may compute a user-specific abandonment score, based on each user's tender-switching practices (or transaction abandonment practices). The user-specific abandonment score may be an indication of a user's likelihood of abandoning a transaction (versus switching tender to possibly show a lower risk a fraud) if his/her transaction request is denied. For example, control logic 180 and user abandonment module 183 may assign a high user-specific abandonment score to a user that may "abandon," e.g., not complete a transaction, if his/her first attempt at completing the transaction is unsuccessful. In other words, a high user-specific abandonment score may be assigned to a user that leaves a store or online checkout session if his/her credit card is denied. A low user-specific abandonment score may be associated with a user that switches tender multiple times if his/her credit cards are denied. FIGS. 4B and 5 include exemplary methods of computing a user-specific abandonment score.

In one embodiment, control logic 180 and calibration module 189 may receive or compute an institutional risk tolerance score. The risk tolerance may reflect a merchant/financial institution's ability to absorb fraudulent activity, desire to build customer affiliation/goodwill, cash flow, etc. The institutional risk tolerance score may be pre-set by an institution. The score may reflect, for example, a merchant, financial institution, or payment issuer's inherent fraud tolerance. Alternately or in addition, the institutional risk tolerance score may be based on the merchant/financial institution's fraud tolerance for a particular user. Control logic 180 and institutional fraud tolerance module 190 may receive, from merchant 110, financial institution 140, or payment issuer (e.g., a credit card company or third party payment service), their tolerance for fraud. As previously described, the institutional risk tolerance score may denote the level of risk of fraud at which the institution will still to authorize a transaction.

Control logic 180 and user tolerance module 191 may further receive or adjust an institutional risk tolerance score, based on the institution's history with a user. For example, a merchant/financial institution may detect that a valuable customer or loyal customer is associated with a transaction request. The institution may increase their risk tolerance in such a case, because the history of transaction with the user may cause the institution to have more trust that the user is not acting fraudulently, or because the institution wishes to offer enhanced customer experience. In such a case, control logic 180 and user tolerance module 191 may increase or prompt an increase an institutional risk tolerance score. Accordingly, control logic 180 and calibration module 189 may compute an institutional risk tolerance score based on input from the institutional fraud tolerance module 190 and/or the user tolerance module 191, to reflect an institution's tolerance for proceeding with a transaction.

In one embodiment, the control logic 180 and payment module 193 may receive or intercept a request to authorize payment for a transaction. The control logic 180 and payment module 193 may then authorize or deny a transaction based on one or more of the user-specific abandonment score (e.g., computed by user abandonment module 183), the fraud risk score (e.g., as received by fraud risk score monitor 187), and the institutional risk tolerance score (e.g., as provided by calibration module 189). In one embodiment, a merchant's priority is to complete a transaction, and completing a non-fraudulent transaction is a secondary concern. In such a case, the decision of whether to authorize payment may include balancing an objective risk of fraud against a merchant/financial institution's tolerance of fraudulent transaction(s) and the likelihood that a user will abandon the transaction. For example, if a user is likely to abandon a transaction immediately after his/her first payment vehicle is denied (e.g., based on a high user abandonment score), a merchant's interest may be to complete the transaction (high institutional risk tolerance) even if there is indication that the payment may be fraudulent (e.g., based on a high fraud risk score). In such a case, control logic 180 and payment module 193 may approve or prompt approval of the request.

If, however, a user is willing to switch to another form of payment, control logic 180 and payment module 193 may deny or prompt denial of the request until the likelihood of fraudulent payment is reduced (e.g., based on the fraud risk score), the risk of fraud is within the merchant/financial institution's institutional risk tolerance (e.g., based on the institutional risk tolerance score), or until the user is likely to abandon the transaction. For example, given the same likelihood of fraud but a user with an abandonment score indicating that the user will switch tender three times before abandoning a transaction, control logic 180 and payment module 193 may deny a transaction two times. Even if the likelihood of fraud is not reduced with the third form of tender offered by the user, control logic 180 and payment module 193 may authorize the transaction with the third form of tender presented by the user, so that the transaction is completed before the user abandons the transaction. For a user with a low abandonment score (indicating that the user will likely switch tender several times), the control logic 201 and payment module 209 may deny authorization until the likelihood of fraud is reduced to an amount acceptable to complete the transaction.

Since the authorization processor 160 may recognize the tender that a user switches between, the authorization processor 160 may also recognize when a user is reaching his/her last form of tender. In one embodiment, the control logic 201 and payment module 209 may authorize a transaction when a user is offering his/her last form of tender for the transaction, even if the likelihood of fraud is not at a level acceptable to complete a transaction. For example, a user may consistently use his/her debit card as the last option for payment. In this case, regardless of whether the user switches cards once or several times, an authorization request from the debit card signals that the user may be about to abandon a transaction. In such a case, the control logic 180 and payment module 193 may grant payment authorization in response to the authorization request.

Further, payment authorization may take into account changes to a likelihood of fraud as tender-switching is observed for a single transaction. For example, risk of fraud may be increasingly lowered if receiving authorization requests are received from various forms of tender in an order that follows the sequence in which a user typically switches tender may lower the risk of fraud, or if the billing addresses of each of the forms of tender match. If tender is being offered in a sequence that follows the user's usual practices, likelihood of fraud may be low. For the same reason, risk of fraud may be higher in situations where authorization request are received from tender or in an order deviating from transaction data of the user associated with the tender.

Figure 2:
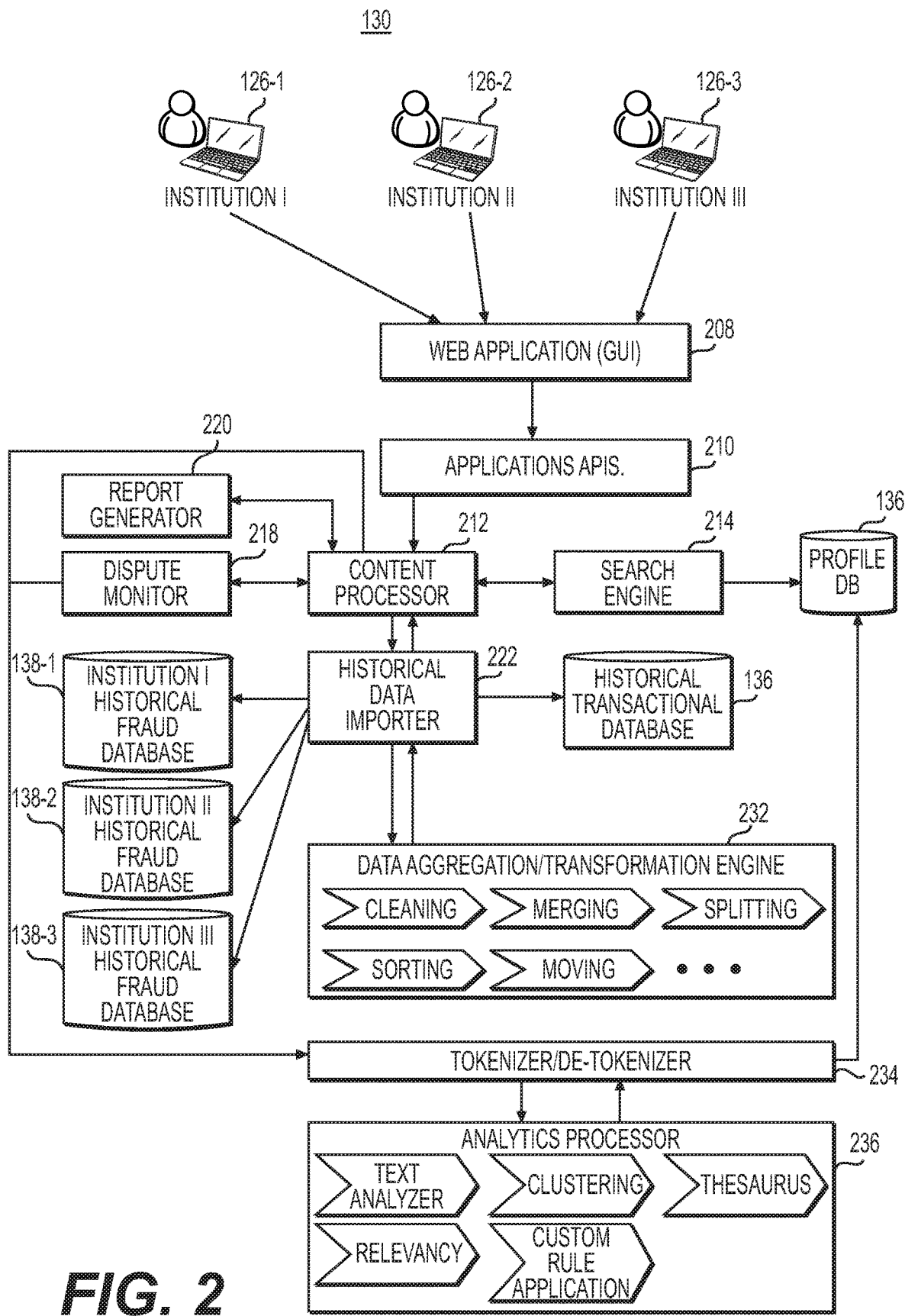
FIG. 2 depicts a schematic diagram of the fraud detection computing system infrastructure of FIG. 1B, according to an exemplary embodiment.

FIG. 2 includes example detailed embodiment of data analysis functions of fraud detection computing system 150. In one embodiment, fraud detection computing system 150 may receive one or more fraud analysis requests from one or more institutions (e.g., merchants, financial institutions, or issuers that may comprise Institution 1126-1, Institution II 126-2, and/or Institution III 126-3). The fraud detection computing system 150 may comprise content processor 212, search engine 214, report generator 220, historical data importer 222, and dispute monitor 218. The fraud detection computing system 150 may include profile database 136 (e.g., of FIG. 1B) and historical fraud database from each of the institution(s) (e.g., 138-1, 138-2, 138-3). Each fraud database may include, for example, information regarding chargebacks logged by each institution. Chargebacks may appear in transaction data, in situations of duplicate billing, a consumer returning a product, or fraudulent transactions. In one embodiment, a chargeback may comprise a fraudulent transaction if a purchase is made using the consumer's payment card without the consumer's knowledge. A chargeback may also be fraudulent in a situation where a consumer is not honest in requesting a chargeback, e.g., in a scenario where consumer may dispute a chargeback for a product even after intentionally buying the product. In the above-illustrated embodiment, the fraud detection computing system 150 may comprise data aggregation/transaction engine (232), tokenizer/de-tokenizer 234, and analytics processor 236.

In an example embodiment, fraud detection computing system 150 may receive one or more fraud analysis requests from the institution(s) (126-1, 126-2, 126-3) using a web application 208 over a computer network. In an example embodiment, issuers may use an Application Programming Interface (API) and Hypertext Transfer Protocol (HTTP). The issuers may use HTTP CRUD (Create, Read, Update, Delete) operations to send the fraud analysis request to the content processor 212.

In the above-illustrated embodiment, the content processor 212 of fraud detection computing system 150 may extract at least one of identifying information of transactions associated with the individual, e.g., Personally Identifiable Information (PII) and a unique account identification from the fraud analysis request submitted by the institution(s) (e.g., 126-1, 126-2, 126-3). The content processor 212 may query the search engine 214 (e.g., processor) to retrieve a fraud analysis profile associated with the identifying information, PII or the unique account identification. The search engine 214 may search for the fraud analysis profile in a profile database 136.

In an example embodiment, search engine 214 may find the fraud analysis profile for the queried fraud analysis request. The search engine 214 may further determine whether the fraud analysis profile is generated within a specific time period (e.g., date and time) provided by the content processor 212. The search engine 214 may deliver the fraud analysis profile to the content processor 212 if the fraud analysis profile is generated within the specific time period. The content processor 212 may analyze the transaction of the fraud analysis request against the fraud analysis profile. The fraud analysis profile may include spending irregularities or suspicious activities associated with the unique account identification or the individual. The content processor 212 may analyze the transaction against spending irregularities or suspicious activities provided in the fraud analysis profile. The content processor 212 may determine a multidimensional fraud risk score for the transaction according to the analysis of chargeback(s) against the fraud analysis profile. The content processor 212 may present the analysis and multidimensional score to the requesting institution (126-1, 126-2, or 126-3) using a web interface, such as web application 208, over a computer network. In an alternative embodiment, the content processor 212 may utilize report generator 220 to analyze the transaction against the fraud analysis profile and generate a report to be sent to the requesting issuer(s). The report could be sent to one or more issuer(s) using, for example, an API or email address of an agent requesting the issuer(s) chargeback analysis. Report generator 220 may be a cloud platform performing the analysis using HTTP protocol.

In an alternative embodiment, institution(s) (126-1, 126-2, 126-3) may configure the content processor 212 to retrieve fraud analysis profiles within a specific range of values of goods and services. In a yet another embodiment, the content processor 212 may provide fraud alert parameters for future transactions to institution(s). The fraud alert parameters include at least one of geographical restrictions, merchant restrictions, purchase price restrictions, etc. In an example embodiment, report generator 220 may be a cloud platform (e.g., Web Service), where the report generator 220 may communicate with the content processor 212 using a Representational State Transfer (REST) Application Programming Interface (API). In an example embodiment, the dispute monitor 218 may be responsible for tracking the fraud analysis request and generating analysis report. The dispute monitor 218 may make calls to an API published by report generator 220 to track progress of analysis report generation and fraud analysis profile generation.

In an alternative embodiment, if the fraud analysis profile is not available for the requested fraud analysis, search engine 214 may send a message to content processor 212. The content processor 212 may generate a unique hash and a fraud analysis profile request. The content processor 212 may send the fraud analysis profile request including the unique hash to historical data importer 222 to generate fraud analysis profile for received identifying information of transactions associated with the individual, PII, or unique account identification. The historical data importer 222 may further import historical fraud (e.g., chargeback) disputes from one or more institution(s) associated with at least one of the identifying information of transactions associated with the individual, PII, and unique account identification. The historical data importer 222 may further import historical transactions from transaction database 144. The transaction database 144 may comprise historical transactions from one or more institution(s). The historical transactions may be retrieved from payment network (120), as shown in FIG. 1B, e.g., when transaction authorization requests are sent for a payment transaction from an online or brick-and-mortar merchant (110) from point of sale terminal to a financial institutions (e.g., Institution(s) 126). Transaction information for historical transactions may be retrieved before the authorization requests are routed to the financial institutions (e.g., Institution(s) 126).

The historical data importer 222 may send the retrieved historical fraud data along with a fraud analysis profile request to a data aggregation/transformation engine 232. The main tasks of data aggregation/transformation 232 may include data extraction, transformation, and loading into a temporary storage system. The data aggregation/transformation engine (e.g., processor) 232 may perform further operations such as data moving, cleaning, splitting, translation, merging, and sorting. The data aggregation/transformation engine 232 may store the transformed data in standard format such as, for example, in a relational database or a distributed file system.

In an alternative embodiment, a tokenizer 234 may tokenize the identifying information of transactions associated with the individual, PII, and the unique account identification associated with the aggregated data. The tokenized data may be further sent to analytics processor 236 for analyzing aggregated data and generating a fraud analysis profile. The analytics processor 236 may use text analyzer, clustering, thesaurus, relevancy, and other custom rules to analyze the aggregated data and generate the fraud analysis profile. A de-tokenizer 234 may de-tokenize the generated fraud analysis profile and store the profile in the profile database 136. In an example embodiment, the dispute monitor 218 may notify the content processor 212 once the profile is generated and stored into the profile database 136. The content processor 212 may analyze one or more transaction(s) (including, for example, chargeback transaction(s)) against the generated fraud analysis profile, determine a multidimensional score, and send the analysis and multidimensional score to the requesting issuer(s).

According to one or more embodiments, the components of infrastructure shown in FIG. 1B-FIG. 2 may be connected by a computer network, such as, for example a local area network (LAN) or a wireless network, such as, for example, a Wi-Fi network. However, other network connections among the components of infrastructure shown in FIG. 1B-FIG. 2 may be used, such as, for example, a wide area network (WAN), the internet, or the cloud. Methods of using payment system 100 and fraud detection computing system 150 according to one or more embodiments will be discussed with respect to FIG. 3A-FIG. 5 below. Functions of the components of infrastructure 100 will be described below with respect to exemplary methods for payment system 100 and fraud detection computing system 150.

FIG. 1B-FIG. 2 and the discussion above provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 1B-FIG. 2. Although not required, aspects of the present disclosure are described in the context of computer-executable instructions, such as routines executed by a data processing device, e.g., a server computer, wireless device, and/or personal computer.

Figure 3A:
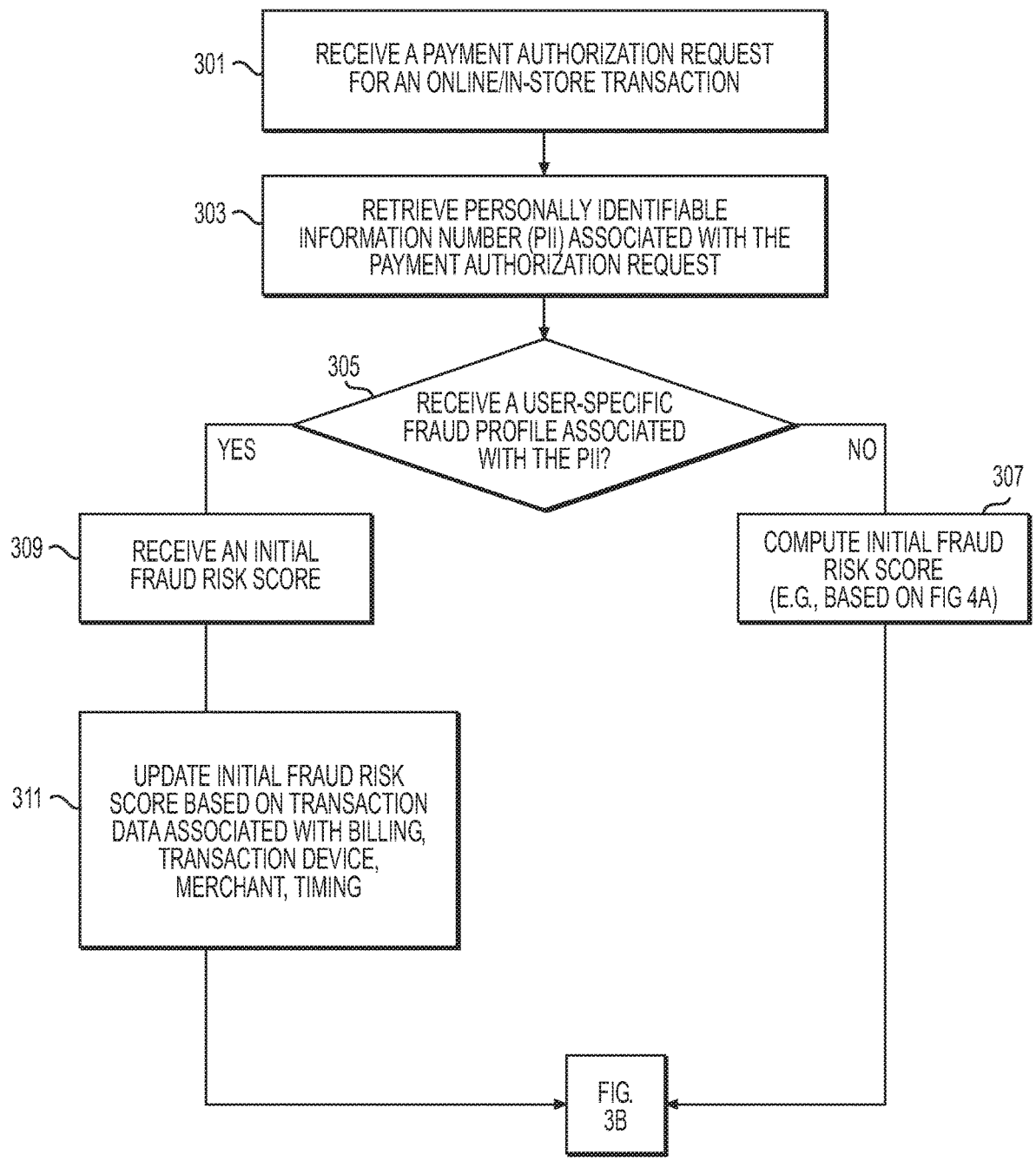
FIGS. 3A and 3B depict flowcharts of a method for authorizing payment for consumer transactions based on historical user data and payment vehicle information, according to an exemplary embodiment of the present disclosure.
Figure 3B:
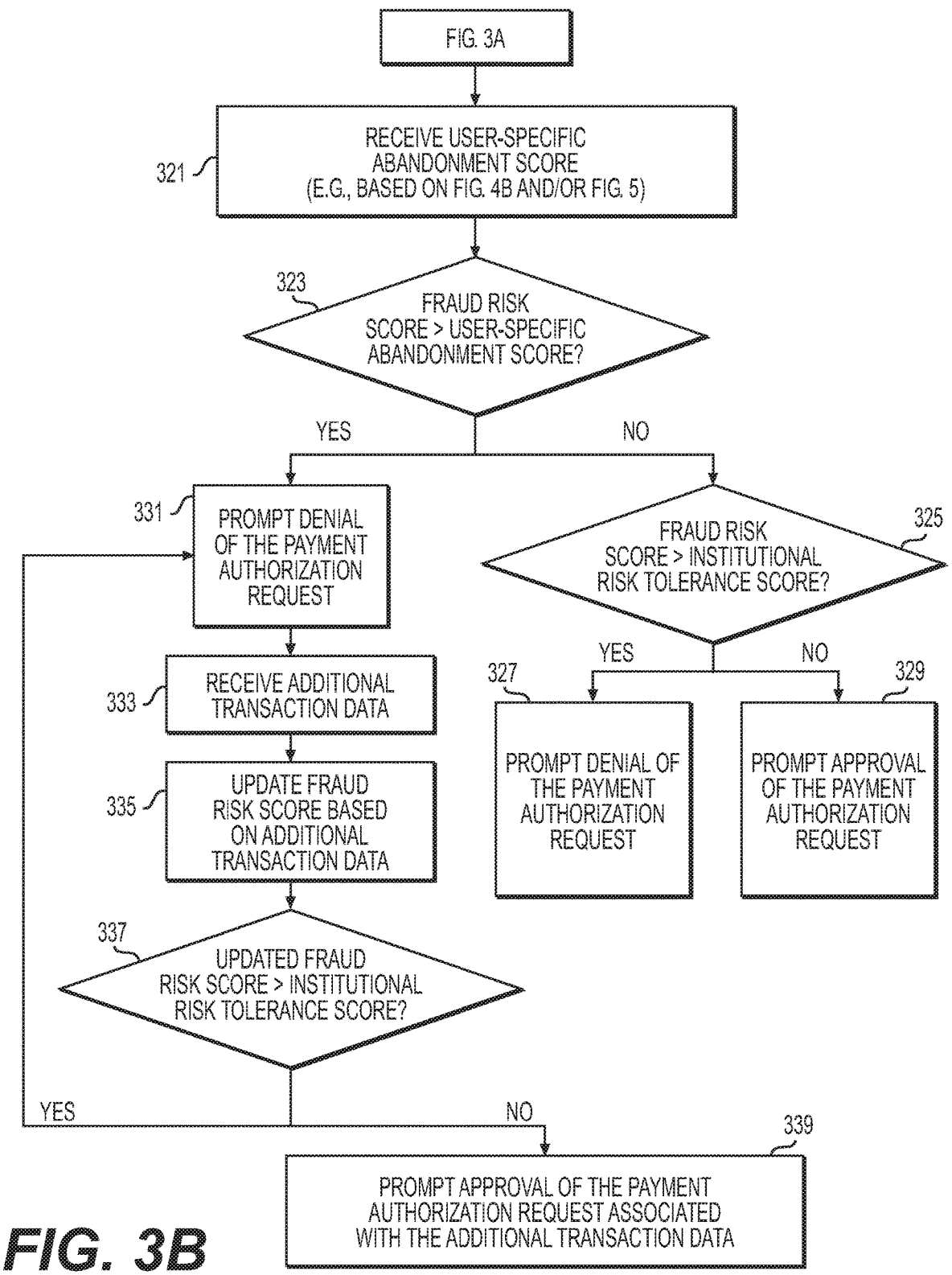
Figure 4A:
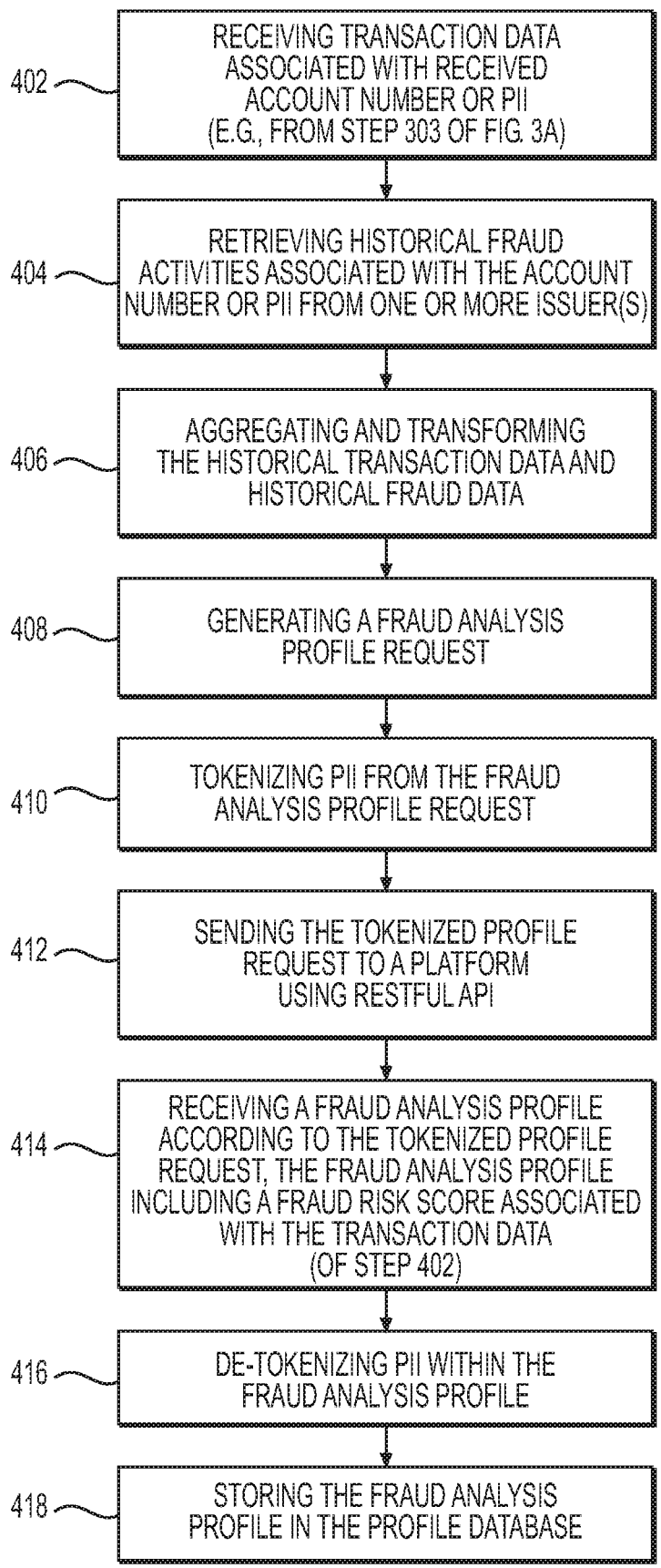
FIG. 4A depicts a flowchart of a method for establishing a fraud analysis profile associated, at least, with a given user, according to an exemplary embodiment of the present disclosure.
Figure 4B:
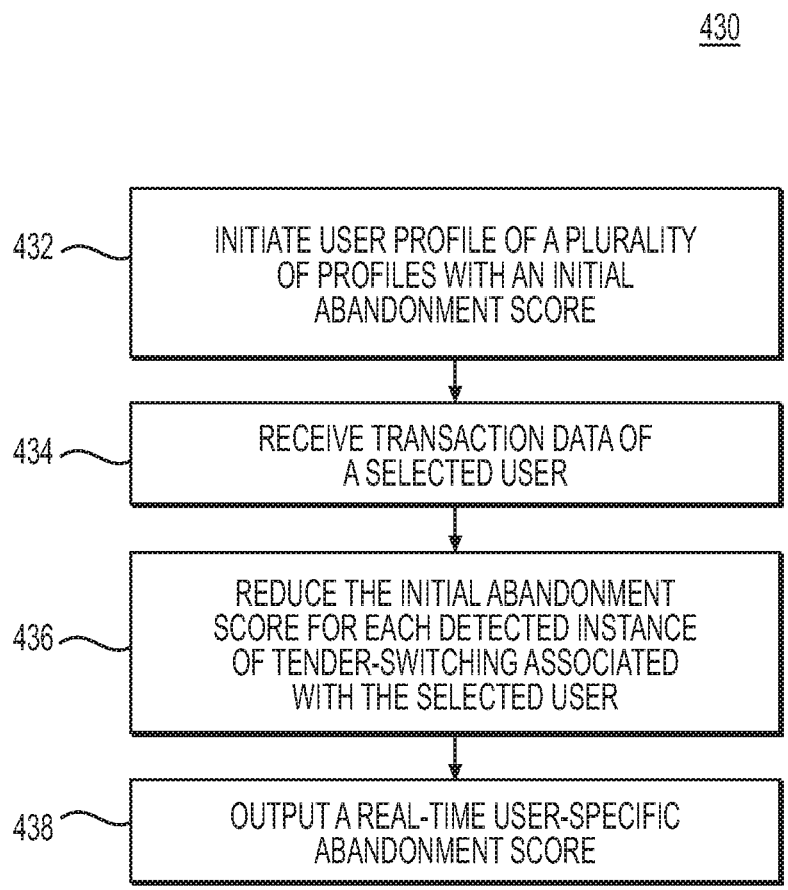
FIG. 4B depicts a flowchart of computing a user-specific abandonment score, according to an exemplary embodiment of the present disclosure.
Figure 5:
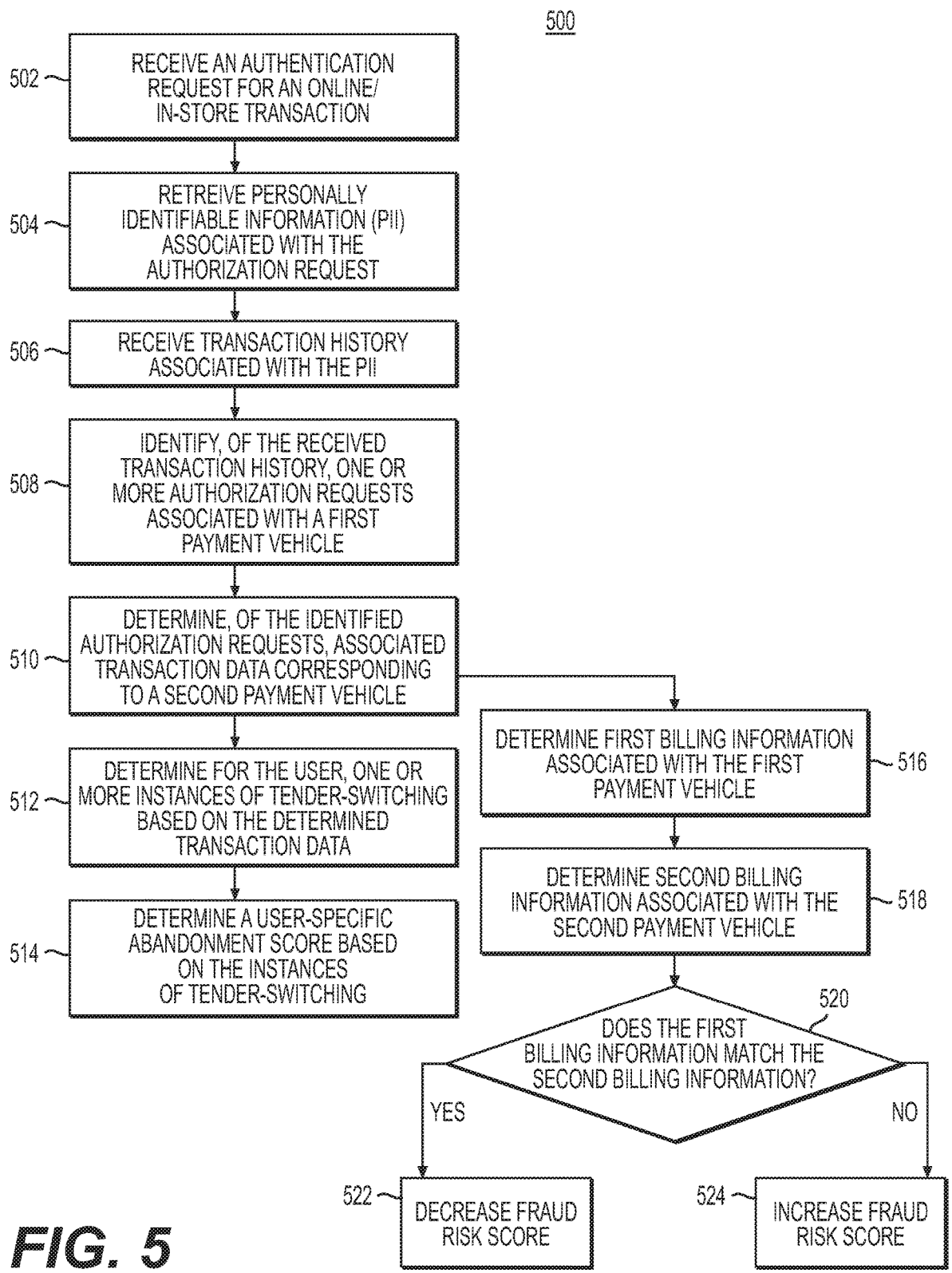
FIG. 5 depicts a flowchart of a detailed method for specific operations related to a user-specific abandonment score and an objective fraud risk score in the event of tender-switching, according to an exemplary embodiment of the present disclosure.

FIGS. 3A-5 depict various methods of the present disclosure. FIGS. 3A and 3B depict a general embodiment of the present disclosure, including a method 300 of authorizing payment based on a fraud risk score, a user-specific abandonment score, and an institutional risk tolerance score. FIGS. 4A-5 provide detailed methods of computing the scores used in payment authorization method 300. For example, FIG. 4A shows an exemplary method for generating a fraud risk score and FIG. 4B shows an exemplary method for generating a user-specific abandonment score. FIG. 5 depicts a particular embodiment for computing a user-specific abandonment score and a fraud risk score, in the event of tender-switching.

Turning to FIGS. 3A and 3B, FIGS. 3A and 3B depict flow diagrams of an exemplary method 300 for authorizing payment for consumer transactions based on historical user data and payment vehicle information, according to an exemplary embodiment of the present disclosure. As described above with respect to FIG. 1B-FIG. 2, a merchant 110 may request authorization for a transaction initiated using a payment vehicle. In an example embodiment, the transaction may be for purchase of an item or a service, or for a withdrawal of cash. Method 300 may be performed, for example, by fraud detection computing system 150 or authorization processor 160, or a combination thereof. In one embodiment, step 301 may include receiving an authorization request for an online or brick-and-mortar transaction over a wireless network. The authorization request may be sent by a merchant 110 over a wireless network, on behalf of a user wishing to make a purchase. Such an authorization request may be intercepted by or otherwise received by fraud detection computing system 150. The request may include transaction data. The transaction data may comprise at least one of a merchant's ID, transaction location, terminal information, source IP address, date and time of the transaction, device information, transaction amount of the purchase, and payment vehicle (e.g., payment card) information.

In one embodiment, step 303 may include receiving identifying information associated with the transaction and transaction data from the authorization request, e.g., before the authorization request is routed to a financial institution. The identifying information may include, for example, personally identifiable information (PII) of an individual associated with the transaction, a device fingerprint, device-specific information, an originating IP address, which may be determined through IP proxy piercing, etc. In one embodiment, step 305 may include searching for or receiving a user-specific fraud profile (e.g., a fraud analysis profile associated with the identifying information associated with the transaction and stored in a profile database 136).

In an example embodiment, if a user-specific fraud profile associated with the identifying information associated with the transaction is not found, an initial fraud risk score may be computed (e.g., step 307). The initial fraud risk score may be based on fraud risk associated with a given user (associated with the transaction), and the billing information, device(s), merchant, and timing of the transaction, as given by the transaction data. The initial fraud risk score may further be based on aggregated transaction data of previous transactions intercepted by fraud detection computing system 150 or authorization processor 160. The initial fraud risk score may provide a prediction as to whether the transaction related to the authorization request is fraudulent. Further detail regarding computing an initial fraud risk score may be found at FIG. 4A.

In an example embodiment, if a profile associated with the identifying information associated with the transaction is found, the transaction data may be compared against transaction data associated with the profile to receive or compute an initial fraud risk score (e.g., step 309). The initial fraud risk score associated with the stored profile may provide a prediction as to whether the transaction related to the authorization request is fraudulent. In one embodiment, the initial fraud risk score associated with the stored profile may be based on past transactions of a user associated with the transaction data associated with the authorization request. For example, the initial fraud risk score of step 309 may be computed based on a user's individual profile. Data of the profile may include at least one of the individual's spending irregularities and analysis of reported fraudulent activity associated with payment vehicles linked to the individual. The spending irregularities of the user may be computed according to the user's spending habits, geographic area, and type of payment cards using for those payments. Additionally, the profile may include personally identifiable information (PII) comprising at least one of a name, physical address, email address, etc. of the user, wherein the payment vehicles may include debit or credit cards issued by at least one financial institution. For example, payment vehicles may include microprocessor-enabled payment cards using computer chips to authenticate transactions according to Europay, MasterCard, and Visa (EMV) global standard. Payment vehicles may further include EMV or NFC compatible payment cards, devices, apps, etc.

In one embodiment, method 300 may include further include step 311 of updating the initial fraud risk score (of step 309) based on the billing information, device(s), merchant, and timing of the transaction, as given by the transaction data. Step 311 may further include updating the initial fraud risk score based on aggregated transaction data of previous transactions intercepted by fraud detection computing system 150 or authorization processor 160. FIGS. 4A and 4C provide exemplary methods for computing the fraud risk score where there is no an existing profile.

Method 300 may further include receiving or determining a threshold at which a transaction is to be determined as "Fraudulent," depending on the fraud risk score. For example, transactions may be determined to be "not fraudulent" if the computed fraud risk score is below the threshold. Transactions in which a computed fraud risk score exceeds the threshold, may be determined as "Fraudulent." In one embodiment, if transaction is fraudulent, a notification may be sent, along with the authorization request, to a financial institution. The notification may denote the transaction as fraudulent. Financial institution 140 may, based on the fraud message, decline the transaction according to the notification. In this way, method 300 may include prompting approval or decline of a transaction associated with an authorization request. In one embodiment, the notification may include a fraudulent activity analysis, which may be attached to the authorization request. In an exemplary embodiment, the authorization request may be presented with the fraudulent activity analysis report at a graphical user interface accessible by a merchant, financial institution, or payment vehicle issuer. In another embodiment, the transaction may be accepted or decline without involving the merchant, financial institution, or payment vehicle issuer.

Step 321 of FIG. 3B may include receiving a user-specific abandonment score (e.g., based on the methods of FIG. 4B or FIG. 5). Step 323 may include evaluating the fraud risk score against the user-specific abandonment score. In other words, step 323 may include weighing the risk of authorizing a fraudulent payment/transaction, versus the risk of losing a transaction because a user abandons the transaction. If step 323 finds the risk of user abandonment higher than the risk of fraud, the risk of fraud may then be weighed against an institutional risk tolerance (e.g., by comparing a fraud risk score against an institutional risk tolerance score for step 325). Step 327 may include prompting denial of the payment authorization request (of step 301) if the risk of fraud is higher than the institutional risk tolerance. Step 329 may include prompting approval of the payment authorization request (of step 301) if the risk of fraud is not higher than the institutional risk tolerance.

If the risk of authorizing a fraudulent payment/transaction is high (as in, the requested authorization is for a transaction or payment that is likely fraudulent), method 300 may proceed to step 331 of denying the payment authorization request (of step 301). Similarly, if the risk of a user abandoning the transaction is low (as in, a user may offer another form of payment that could lower the risk of authorizing a fraudulent payment/transaction), method 300 may proceed to step 331 of denying the payment authorization request (of step 301).

Upon denial of the payment authorization request, a user may offer another form a tender to complete the transaction (e.g., "switch tender"). In such a case, additional transaction data may be received (e.g., step 333). This additional transaction data may include or indicate new payment vehicle information distinct from payment information of the payment authorization request of step 301. Step 335 may include updating the initial fraud risk score (e.g., of step 309) based on the additional transaction data. FIG. 5 includes an exemplary method of updating fraud risk scores. If the updated fraud risk score brings the likelihood of fraud within the risk tolerance of an institution that may pay the payment entailed in the payment authorization request, the payment authorization request associated with the additional transaction data (and new payment vehicle) may be approved (e.g., steps 337 and 339).

The risk tolerance of the institution may be indicated by an institutional risk tolerance score. If the fraud risk score is too high relative to the institutional risk tolerance score (meaning, the risk of fraud is higher than the risk the institution will tolerate), the payment authorization request may still be denied. Steps 331-337 may be repeated until the fraud risk score is less than the institutional risk tolerance score. Step 323 may also be performed iteratively with steps 331-337, to take into account a user's likelihood of abandoning the transaction, rather than continuing to switch tender (and provide additional transaction data).

FIGS. 4A-5 provide additional embodiments of methods for computing the scores used in method 300. FIG. 4A depicts a method of generating a fraud risk score, based on a user-specific fraud analysis profile. FIG. 4B depicts a method of interactively computing real-time user-specific abandonment scores. FIG. 5 describes the influences that contextual data may have on both the fraud risk score and the user-specific abandonment score. In particular, FIG. 5 describes a method of computing a fraud risk score and a user-specific abandonment score, when tender-switching is detected.

FIG. 4A depicts a flowchart of a method 400 for establishing a fraud analysis profile associated, at least, with a given user, according to one or more embodiments. Step 402 of method 400 may include receiving an authorization request for transaction over a wireless network. The request may include transaction data linked to a given user, e.g., PII from step 303 of FIG. 3A. The user may be associated with one or more identifiers, including an account number or PII. In one embodiment, step 402 may further include receiving historical (e.g., stored) transaction data associated with the user's account identification or PII. The PII may be comprised of at least one of name, physical address, email address, etc. of the user. Alternately or in addition, the PII may further include information of individuals related to the user (e.g., family members or individuals sharing an account with the user). The historical transaction data may be received from a database (e.g., transaction database 144). The historical transaction data may be associated with the account number or PII, and may include at least one of a merchant's identification, a location and terminal information, a source IP address, a date and time, device information, and a transaction amount for each of one or more purchase transactions. Step 404 may include retrieving (e.g., from financial institutions) reports of fraudulent activities associated with the user's account identification or PII. Step 406 may include aggregating transaction data associated with the authorization request, retrieved historical transaction data, and/or reported fraudulent activities in a temporary data storage.

In an example embodiment, a fraud analysis profile may be generated by a cloud platform with specialized analytics to evaluate the likelihood of fraud, based on transaction data and reports of fraud across multiple individuals and financial institutions. In such a case, step 408 may include creating a request to generate a fraud analysis profile for the given user, wherein the fraud analysis profile request includes the user's account identification or PII, and at least one of aggregated historical transaction data, reported fraudulent activities, and a unique profile identifier. The fraud analysis profile request may further specify a request for fraud analysis within a specified time period and/or a specified value of the goods and services. Step 410 may include tokenizing account identification or PII within the fraud analysis profile request. Step 412 may include sending the fraud analysis profile generation request to a cloud platform for analysis using a Representational State Transfer (REST) API.

Step 414 may include receiving a fraud analysis profile from the cloud platform using the REST API, the received fraud analysis profile including a fraud risk score for the transaction of the authorization request (of step 402). Step 416 may include detokenizing the user's account identification or PII within the received fraud analysis profile according to operation 414. Step 418 may include storing the detokenized fraud analysis profile (e.g., in profile database 136). The fraud analysis profile may include at least one of spending irregularities and suspicious activities associated with the user. The spending irregularities may be calculated based on, for example, at least one of the user's spending patterns, geographic region of IP address, billing address, and a type of payment card. The type of fraud analysis profile request may comprise of a fraud analysis request for transactions within a specified value of the goods and services. The fraud analysis profile may provide one or more fraud alert parameters for future transactions, e.g., related to tender switching or abandonment.

FIG. 4B is a flow diagram of an exemplary method 430 for computing a user-specific abandonment score, according to an exemplary embodiment of the present disclosure. In one embodiment, step 432 may include receiving a profile associated with a user new to payment system 100. Step 432 may include providing the user profile with an initial abandonment score. In one embodiment, every user of payment system 100 may start at the same initial abandonment score.

In one embodiment, step 434 may include receiving transaction data of the user. In one embodiment, step 436 may include detecting, in the received transaction data, instance(s) of tender switching. For example, step 436 may include defining indications of tender switching. Tender switching may be detected from transaction data in a variety of ways. One exemplary indication of tender switching may include authorization requests being receiving from multiple payment vehicles for the same transaction. Another indication of tender switching may include detecting that a transaction is completed with payment from a source other than a payment vehicle that had requested authorization for the transaction. Step 436 may include defining one or more indicators of tender switching, and tracking the tender-switching behavior associated with the user.

In one embodiment, step 436 may further include reducing the initial abandonment score (e.g., of step 432) for each detected instance of tender switching in the transaction data. In other words, each instance of tender switching may trigger a reduction in the initial abandonment score. In one embodiment, the reduction in the initial abandonment score may be predetermined, relative to the detected number of tender switching instances. In one payment network, an abandonment score may be reduced by 0.1 points for each detected instance of tender switching. Another payment network may dictate that an abandonment score is reduced by 0.1 points for every 100 detected instances of tender switching. Different types of tender switching may also trigger different score changes. For example, switching between credit cards may entail one predetermined reduction of the score, while switching from a credit card to cash may entail a different predetermined reduction of the score. Further, the types of cards used may involve different changes to the user-specific abandonment score. For example, a user may possess a few cards that are not widely accepted by merchants. In such a case, a user switching between those cards may not trigger a great reduction in abandonment score, whereas a user switching between widely accepted cards may prompt a greater reduction.

Score reductions may also change if a user's frequency of tender switching increases or shows signs of irregularity during certain periods of time. For example, a user may rarely engage in tender switching for years, and then there may be a spike in tender switching activity during a period of months. Step 436 may reduce the score by a predetermined amount specifically for the frequency of tender-switching.

In one embodiment, step 438 may include computing a user-specific abandonment score based on the received transaction data. In one embodiment, the user-specific abandonment score may be computed in real-time, as data is received regarding a user's transactions. The reductions of the abandonment score may be made to the initial abandonment score, as well as the user's score at any point in time. Although the embodiment of method 430 describes the changes to the user's abandonment score as reductions, one of ordinary skill in the art may recognize that an alternate embodiment may include increasing an abandonment score as the instances of tender switching increase.

FIG. 5 is a flow diagram of an exemplary method 500 for specific operations related to the user-specific abandonment score and the objective fraud risk score in the event of tender-switching, according to an exemplary embodiment of the present disclosure. Step 502 may include receiving an authorization request for transaction over a wireless network. The request may include transaction data linked to a given user. The user may be associated with one or more identifiers, including an account number or PII. Step 504 may include retrieving an account number or PII associated with the received authorization request. Step 506 may include receiving transaction history associated with a user (e.g., by receiving transaction data associated with the retrieved account number or PII). For example, step 506 may include accessing a profile associated with the account number or PII. The profile may include one or more payment vehicles associated with the account number or PII, as well as a fraud analysis profile associated with the user. The received transaction history or the accessed fraud analysis profile may include data on the user's usage of each of the payment vehicles associated with the user. The received transaction history may also include one or more authorization requests for transactions associated the user and completed transactions associated with the user.

In one embodiment, steps 508 and 510 may include isolating transactions in which tender switching takes place. For example, step 508 may include identifying, of the received transaction history, one or more authorization request(s) associated with a first payment vehicle. Step 510 may include determining, of the identified authorization requests, a transaction associated with the authorization request. For each determined transaction, step 510 may include detecting transaction data associated with a second payment vehicle. The transaction data associated with the second payment vehicle may include a second authorization request for the determined transaction, where the second authorization request is associated with the second payment vehicle. The transaction data may also include data of transaction completion using the second payment vehicle.

In one embodiment, step 512 may include determining, for the user, one or more instances of tender switching, based on the transaction data associated with a second payment vehicle. For example, steps 508 and 510 may include isolating, from a user's transaction history, transactions where authorization is sought from more than one form of tender. Step 512 may include identifying these types of transactions as instances of tender switching. Step 512 may further include detecting authorization requests in a user's transaction history, where the authorization request is not paired with a payment authorization at all. In such cases, the user may have abandoned the transaction after the payment authorization was denied.

In one embodiment, step 514 may include determining a user-specific threshold fraud score based on the detected instances of tender switching. Put another way, step 514 may include determining a user-specific threshold fraud score based on the detected instances of a user abandoning a transaction, or instances of a user switching tender prior to abandoning a transaction.

In one embodiment, method 500 may further include adjusting an objective fraud risk score, based on detected tender switching. In one embodiment, a fraud risk score may be adjusted based on billing information associated with tender switching. For example, fraud risk may increase if billing information between tender used in tender switching is inconsistent. Accordingly, a fraud risk score may be increased if multiple billing information is detected. A fraud risk score may decrease if billing information is consistent across all or most of the tender used in throughout a user's tender switching. For example, upon detection of tender switching or multiple payment vehicles being used for a transaction (e.g., by step 510), steps 516-520 may include comparing billing information related to the payment vehicles. For instance, step 516 may include determining first billing association associated with the first payment vehicle (e.g., of step 508). Step 518 may include determining second billing information associated with the second payment vehicle (e.g., of step 510). Step 520 may include comparing the first billing information to the second billing information. Step 522 may include prompting a decrease in a fraud risk score, in the event that the first billing information is consistent (e.g., matches) with the second billing information. Conversely, step 524 may include prompting in increase in a fraud risk score if the first billing information does not match the second billing information.

Figure 6:
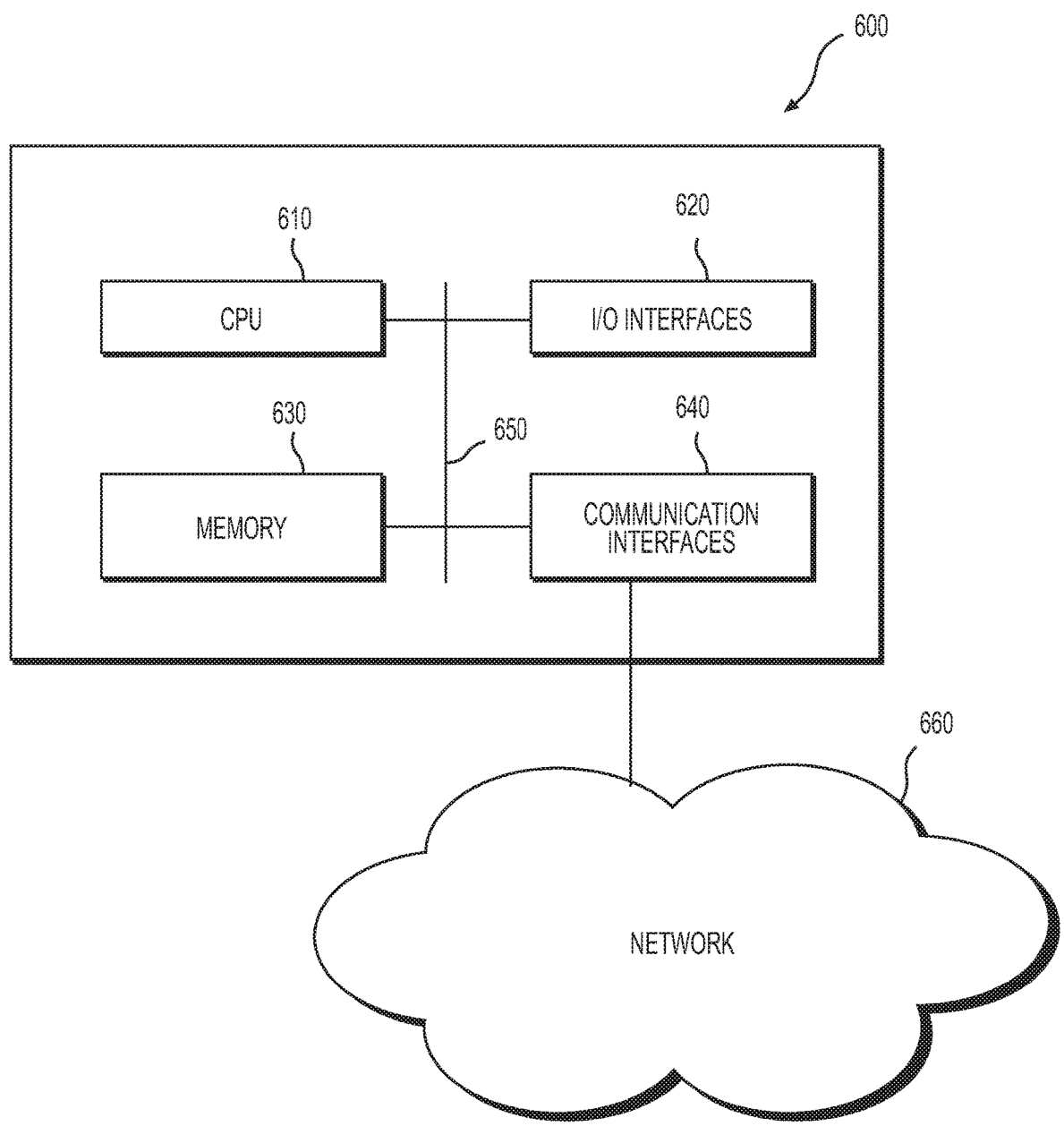
FIG. 6 depicts an example of a computing device for establishing a payment system for processing transactions, according to an exemplary embodiment of the present disclosure.

FIG. 6 illustrates an example computing device. A computing device 600 may be a server, a computing device that is integrated with other systems or subsystems, a mobile computing device such as a smart phone, a cloud-based computing ability, and so forth. The computing device 600 may be any suitable computing device as would be understood in the art, including without limitation, a custom chip, and embedded processing device, a tablet computing device, a POS terminal associated with a merchant (e.g., merchant 110), a back-office system of a merchant, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 600 may include a processor 610 that may include any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 600 may also include one or more memories 630, for example a read-only memory (ROM), random access memory (RAM), cache memory associated with the processor 610, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 600 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 610, or memories 630 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

One or more networking communication interfaces 640 may be configured to transmit to, or receive data from, other computing devices 600 across a network 660. The network and communication interfaces 640 may include an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 640 may include wire data transmission links such as Ethernet and TCP/IP. The communication interfaces 640 may include wireless protocols for interfacing with private or public networks 660. For example, the network and communication interfaces 640 and protocols may include interfaces for communicating with private wireless networks such as Wi-Fi network, one of the IEEE 802.11x family of networks, or another suitable wireless network. The network and communication interfaces 640 may include interfaces and protocols for communicating with public wireless networks 660, using for example wireless protocols used by cellular network providers, including Code Division Multiple Access (CDMA) and Global System for Mobile Communications (GSM). A computing device 600 may use network and communication interfaces 640 to communicate with hardware modules such as a database or data store, or one or more servers or other networked computing resources. Data may be encrypted or protected from unauthorized access.

In various configurations, the computing device 600 may include a system bus 650 for interconnecting the various components of the computing device 600, or the computing device 600 may be integrated into one or more chips such as programmable logic device or application specific integrated circuit (ASIC). The system bus 650 may include a memory controller, a local bus, or a peripheral bus for supporting input and output device interfaces 620, and communication interfaces 640. Example input and output interfaces or devices 620 include keyboards, keypads, gesture or graphical input devices, motion input devices, touchscreen interfaces, one or more displays, audio units, voice recognition units, vibratory devices, computer mice, and any other suitable user interface.

The processor 610 and memory 630 may include nonvolatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

The embodiments of the present disclosure are directed to a system and method in which payment authorization may weigh objective fraud risk against a user's interests and a merchant's interest. In particular, the embodiments of the present disclosure provides a way account for contextual factors of a transaction and a user's habits when processing transactions. For example, a user may have multiple credit and debit cards. The present disclosure includes a system and method that may authorize or deny transaction authorization in light of the user's practices in switching among his/her many credit or debit cards, and in light of the contextual factors of the transaction, including the billing address(es) or name(s) associated with payment vehicle(s) used for the transaction, the device(s) used in the transaction, the merchant whom the user is conducting the transaction, the time (e.g., time of day) of the transaction, etc. In particular, payment authorization for a single transaction may depend on the user's likelihood or habit of switching between his/her multiple credit and debit cards (aka, tender-switching habit) and the billing information associated with each of the cards.

Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of establishing a multi-dimensional fraud detection system and payment analysis, the method comprising:
   receiving transaction history of a user, the transaction history including a first payment vehicle and a second payment vehicle;
   generating a unique hash and a fraud analysis profile request upon determining a fraud analysis profile is not available, and sending the fraud analysis profile request including the unique hash to generate the fraud analysis profile from the received transaction history of the user;
   determining, of the received transaction history, one or more instances of switching from the first payment vehicle to the second payment vehicle; and
   determining a user-specific abandonment score for the user, based on the determined instances of switching from the first payment vehicle to the second payment vehicle.

2. The computer-implemented method of claim 1, further comprising:
   determining first billing information associated with the first payment vehicle;
   determining second billing information associated with the second payment vehicle; and
   decreasing a fraud risk score if the first billing information matches the second billing information, or
   increasing a fraud risk score if the first billing information does not match the second billing information.

3. The computer-implemented method of claim 2, further comprising:
   prompting approval of a payment transaction based on the user-specific abandonment score and the fraud risk score.

4. The computer-implemented method of claim 2, further comprising:
   computing the fraud risk score based on billing data, device data, merchant data, or timing data of the received transaction history.

5. The computer-implemented method of claim 1, further comprising:
   identifying, of the transaction history, one or more authorization requests associated with the first payment vehicle;
   determining, of the identified authorization requests, transaction data associated with the identified authorization requests, wherein the transaction data corresponds to a second payment vehicle; and
   determining the one or more instances of switching from the first payment vehicle to the second payment vehicle, based on the transaction data.

6. The computer-implemented method of claim 1, further comprising:
   receiving a first payment authorization request associated with the user;
   receiving a fraud risk score associated with the first payment authorization request;
   receiving an institutional risk tolerance score; and
   prompting approval of the first payment authorization request based on the user-specific abandonment score, the fraud risk score, and the institutional risk tolerance score.

7. The computer-implemented method of claim 6, further comprising:
   denying the first payment authorization request unless the fraud risk score is less than the institutional risk tolerance score.

8. The computer-implemented method of claim 6, further comprising:
   receiving a profile associated with the user;
   computing an initial fraud risk score based on the profile and transaction data of the first payment authorization request;
   receiving a second payment authorization request; and
   updating initial fraud risk score based on the second payment authorization request.

9. The computer-implemented method of claim 1, wherein the transaction history includes, one or more of:
   an identifier of the merchant;
   an identifier of the user;
   an identifier of one or more payment means accessed for payment of the transaction;
   an itemization of the goods and/or services transacted for;
   any geographical and/or temporal information of the transaction;
   any taxes, tips, and/or gratuities;
   any discounts, coupons, reductions;
   any fees directed towards acquirers, issuers, payment networks;
   currency exchange rates; and
   any other attributes of the payment transaction.

10. The computer-implemented method of claim 1, further comprising:
    prompting approval of a payment transaction based on the user-specific abandonment score.

11. A decentralized computer system for establishing a multi-dimensional fraud detection system and payment analysis, the system comprising:
    a data storage device storing instructions for establishing a multi-dimensional fraud detection system and payment analysis; and
    a processor configured to execute the instructions to perform a method including:
       receiving transaction history of a user, the transaction history including a first payment vehicle and a second payment vehicle;
       generating a unique hash and a fraud analysis profile request upon determining a fraud analysis profile is not available, and sending the fraud analysis profile request including the unique hash to generate the fraud analysis profile from the received transaction history of the user;
       determining, of the received transaction history, one or more instances of switching from the first payment vehicle to the second payment vehicle; and
       determining a user-specific abandonment score for the user, based on the determined instances of switching from the first payment vehicle to the second payment vehicle.

12. The system of claim 11, wherein the processor is further configured for:
    determining first billing information associated with the first payment vehicle;
    determining second billing information associated with the second payment vehicle; and
    decreasing a fraud risk score if the first billing information matches the second billing information, or
    increasing a fraud risk score if the first billing information does not match the second billing information.

13. The system of claim 12, wherein the processor is further configured for:
    prompting approval of a payment transaction based on the user-specific abandonment score and the fraud risk score.

14. The system of claim 12, wherein the processor is further configured for:
    computing the fraud risk score based on billing data, device data, merchant data, or timing data of the received transaction history.

15. The system of claim 11, wherein the processor is further configured for:
    identifying, of the transaction history, one or more authorization requests associated with the first payment vehicle;
    determining, of the identified authorization requests, transaction data associated with the identified authorization requests, wherein the transaction data corresponds to a second payment vehicle; and
    determining the one or more instances of switching from the first payment vehicle to the second payment vehicle, based on the transaction data.

16. The system of claim 11, wherein the processor is further configured for:
    receiving a first payment authorization request associated with the user;
    receiving a fraud risk score associated with the first payment authorization request;
    receiving an institutional risk tolerance score; and
    prompting approval of the first payment authorization request based on the user-specific abandonment score, the fraud risk score, and the institutional risk tolerance score.

17. The system of claim 11, wherein the transaction data includes, one or more of:
    an identifier of the merchant;
    an identifier of the user;
    an identifier of one or more payment means accessed for payment of the transaction;
    an itemization of the goods and/or services transacted for;
    any geographical and/or temporal information of the transaction;
    any taxes, tips, and/or gratuities;
    any discounts, coupons, reductions;
    any fees directed towards acquirers, issuers, payment networks;
    currency exchange rates; and
    any other attributes of the payment transaction.

18. The system of claim 11, wherein the processor is further configured for:
    prompting approval of a payment transaction based on the user-specific abandonment score.

19. A non-transitory machine-readable medium storing instructions that, when executed by a server, cause the server to perform a method for establishing a multi-dimensional fraud detection system and payment analysis, the method including:
    receiving transaction history of a user, the transaction history including a first payment vehicle and a second payment vehicle;
    generating a unique hash and a fraud analysis profile request upon determining a fraud analysis profile is not available, and sending the fraud analysis profile request including the unique hash to generate the fraud analysis profile from the received transaction history of the user;
    determining, of the received transaction history, one or more instances of switching from the first payment vehicle to the second payment vehicle; and
    determining a user-specific abandonment score for the user, based on the determined instances of switching from the first payment vehicle to the second payment vehicle.

20. The machine readable medium of claim 19, wherein the method further comprises:
- determining first billing information associated with the first payment vehicle;
- determining second billing information associated with the second payment vehicle; and
- decreasing a fraud risk score if the first billing information matches the second billing information, or increasing a fraud risk score if the first billing information does not match the second billing information.

\* \* \* \* \*